United States Patent [19]
Park

[11] Patent Number: 5,967,935
[45] Date of Patent: Oct. 19, 1999

[54] POWERTRAIN FOR 5-SPEED AUTOMATIC TRANSMISSIONS

[75] Inventor: Jongsool Park, Kyunggi-do, Rep. of Korea

[73] Assignee: Hyundai Motor Company, Seoul, Rep. of Korea

[21] Appl. No.: 08/998,741

[22] Filed: Dec. 29, 1997

[30] Foreign Application Priority Data

Aug. 10, 1997 [KR] Rep. of Korea ........................ 97-51613

[51] Int. Cl.[6] ...................................................... F16H 3/00
[52] U.S. Cl. ............................ 475/275; 475/279; 475/286
[58] Field of Search ................................... 475/269, 275, 475/276, 279, 280, 286, 288, 290

[56] References Cited

U.S. PATENT DOCUMENTS

| | | | |
|---|---|---|---|
| 4,046,031 | 9/1977 | Ott et al. | 475/279 X |
| 4,070,927 | 1/1978 | Polak | 475/275 X |
| 4,683,776 | 8/1987 | Klemen | 475/279 X |
| 4,823,641 | 4/1989 | Kuhn et al. | 475/279 X |
| 5,643,130 | 7/1997 | Park | 475/278 X |

FOREIGN PATENT DOCUMENTS 1705648  1/1992  U.S.S.R. ................................ 475/286

*Primary Examiner*—Khoi Q. Ta
*Attorney, Agent, or Firm*—Finnegan, Henderson, Farabow, Garrett & Dunner, L.L.P.

[57] ABSTRACT

A powertrain which is used for a 5-speed automatic transmission. The powertrain includes a first compound planetary gearset and a second compound planetary gearset. The first compound planetary gearset comprises first and second simple planetary gearsets having first, second, third, and fourth operating elements, while the second compound planetary gearset comprises third and fourth simple planetary gearsets having fifth, sixth, seventh, and eighth operating elements. The sixth operating element being fixedly connected to the third operating element, and the seventh and eighth operating elements are variably connected to the fourth operating element. Clutches are disposed between the seventh and fourth operating elements, and between the eighth and fourth operating elements. A brake is interposed between at least one of the operating elements of the first and second compound planetary gearsets and a transmission housing.

57 Claims, 27 Drawing Sheets

FIG.5

*Operation Chart*

| Shift Range | C1 | C2 | B1 | B2 |
|---|---|---|---|---|
| R |  |  | ○ | ○ |
| D1 | ○ |  | ○ |  |
| D2 | ○ |  |  | ○ |
| D3 | ○ | ○ |  |  |
| D4 |  | ○ |  | ○ |
| D5 |  | ○ | ○ |  |

POWERTRAIN FOR 5-SPEED AUTOMATIC TRANSMISSIONS

FIELD OF THE INVENTION

The present invention relates to a powertrain for automatic transmissions, and more particularly, to a powertrain for a 5-speed automatic transmission which can be designed to be compact in size and lightweight by reducing the number of friction elements and planetary gearsets.

BACKGROUND OF THE INVENTION

Generally, automatic transmissions include a transmission control unit (TCU) for automatically controlling shift ratios according to variations in vehicle speed and load.

The TCU controls friction elements, a plurality of which are provided in a powertrain, to ON and OFF states to select one of the three elements of a planetary gearset (sun gear, ring gear, and planet carrier) to be an input element, another a reaction element, and the last an output element, thereby controlling the number of output revolutions.

To design a powertrain so that four forward speeds and one reverse speed can be output, one compound planetary gearset, comprised of two simple planetary gearsets, and at least five friction elements are used. The compound planetary gearset is structured such that elements from one planetary gearset are integrated or shared with elements from another planetary gearset.

However, the powertrain structured as in the above has the disadvantage of having a limited number of forward speeds, i.e., four. As a result, the powertrain can not make full use of the power provided by increasingly high-output engines. Also, the powertrain is not fuel efficient.

As a solution, there is provided a prior art powertrain having five forward speeds and one reverse speed. Such a powertrain is comprised of three simple planetary gearsets and at least six friction elements.

However, in such a powertrain for a 5-speed automatic transmission, to drive the vehicle in fourth or fifth-speed overdrive, there is a need for an element which rotates at a higher speed than that of a final output element. This results in a substantial amount of power loss. In addition, the large number of friction elements results in a heavy and large-size automatic transmission.

SUMMARY OF THE INVENTION

The present invention has been made in an effort to solve the above problems. It is an object of the present invention to provide a powertrain for a 5-speed automatic transmission which minimizes power loss by eliminating an element rotating faster than a final output element needed in the prior art when in overdrive.

It is another object of the present invention to provide a powertrain for a 5-speed automatic transmission which can be designed to be compact in size and lightweight by reducing the number of friction elements.

To achieve the above objects, the present invention provides a powertrain for a 5-speed automatic transmission comprising a first compound planetary gearset comprising first and second simple planetary gearsets having first, second, third, and fourth operating elements, said first operating element acting as an input element; a second compound planetary gearset comprising third and fourth simple planetary gearsets having fifth, sixth, seventh, and eighth operating elements, said fifth operating element acting as an output element, said sixth operating element being fixedly connected to the third operating element, and said seventh and eighth operating elements being variably connected to the fourth operating element; clutch means for variably connecting said seventh and eighth operating elements to the fourth operating element; and brake means for selectively connecting at least one of the operating elements of the first and second compound planetary gearsets to a transmission housing.

The first compound planetary gearset is realized through the combination of the first and second simple planetary gearsets, and said second compound planetary gearset is realized through the combination of the third and fourth simple planetary gearsets, said first, second, third, and fourth simple planetary gearsets being single pinion planetary gearsets.

A sun gear and a ring gear of the first simple planetary gearset are fixedly connected respectively to a sun gear and a ring gear of the second simple planetary gearset.

The first operating element is a combination of the sun gears of the first and second simple planetary gearsets; the second operating element is a planet carrier of the first simple planetary gearset; the third operating element is a planetary carrier of the second simple planetary gearset; and the fourth operating element is a combination of the ring gears of the first and second simple planetary gearsets.

The planet carrier and ring gear of the first simple planetary gearset are fixedly connected respectively to the ring gear and sun gear of the second simple planetary gearset.

The first operating element is the sun gear of the first simple planetary gearset; the second operating element is a combination of the planet carrier and ring gear of the first and second simple planetary gearsets; the third operating element is the planet carrier of the second simple planetary gearset; and the fourth operating element is a combination of the ring gear and sun gear of the first and second simple planetary gearsets.

The planet carrier and ring gear of the first simple planetary gearset are fixedly connected respectively to the planet carrier and ring gear of the second simple planetary gearset.

The first operating element is the sun gear of the second simple planetary gearset; the second operating element is the ring gear of the first simple planetary gearset; the third operating element is a combination of the planet carriers of the first and second simple planetary gearsets; and the fourth operating element is a combination of the sun gear and ring gear of the first and second simple planetary gearsets.

A planet carrier and a ring gear of the third simple planetary gearset are fixedly connected respectively to a planet carrier and a sun gear of the fourth simple planetary gearset.

The fifth operating element is a sun gear of the third simple planetary gearset; the sixth operating element is a ring gear of the fourth simple planetary gearsets; the seventh operating element is a combination of the planet carriers of the third and fourth simple planetary gearset; and the fourth operating element is a combination of the ring gear and sun gear of the third and fourth simple planetary gearsets.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The first compound planetary gearset is realized by the combination of the first simple planetary gearset, which is a double pinion planetary gearset, with the second simple planetary gearset, which is a single pinion planetary gearset, and the second compound planetary gearset is realized by the combination of the third and fourth simple planetary gearsets, both of which are single pinion planetary gearsets.

The planet carrier and sun gear of the first simple planetary gearset are fixedly connected respectively to the ring gear and sun gear of the second simple planetary gearset.

The first operating element is a combination of the sun gears of the first and second simple planetary gearsets; the second operating element is the ring gear of the first simple planetary gearset; the third operating element is the planetary carrier of the second simple planetary gearset; and the fourth operating element is a combination of the planet carrier and ring gear of the first and second simple planetary gearsets.

The sun gear and ring gear of the first simple planetary gearset are fixedly connected respectively to the ring gear and planet carrier of the second simple planetary gearset.

The first operating element is the sun gear of the second simple planetary gearset; the second operating element is the planet carrier of the first simple planetary gearset; the third operating element is a combination of the ring gear and planet carrier of the first and second simple planetary gearsets; and the fourth operating element is a combination of the sun gear and ring gear of the first and second simple planetary gearsets.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The planet carrier and ring gear of the third simple planetary gearset is fixedly connected respectively to the planet carrier and sun gear of the fourth simple planetary gearset.

The fifth operating element is the sun gear of the third simple planetary gearset; the sixth operating element is the ring gear of the fourth simple planetary gearsets; the seventh operating element is a combination of the planet carriers of the third and fourth simple planetary gearset; and the fourth operating element is a combination of the ring gear and sun gear of the third and fourth simple planetary gearsets.

The first compound planetary gearset is realized by the combination of the first simple planetary gearset, which is a single pinion planetary gearset, with the second simple planetary gearset, which is a double pinion planetary gearset, and the second compound planetary gearset is realized by the combination of the third and fourth simple planetary gearsets, both of which are single pinion planetary gearsets.

The planet carrier and ring gear of the first simple planetary gearset are fixedly connected respectively to a sun gear and a planet carrier of the second simple planetary gearset.

The first operating element is the sun gear of the first simple planetary gearset; the second operating element is a combination of the planet carriers of the first and second simple planetary gearsets; the third operating element is the ring gear of the second simple planetary gearset; and the fourth operating element is a combination of the ring gear and sun gear of the first and second simple planetary gearsets.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The first compound planetary gearset is realized by the combination of the first and second simple planetary gearsets, both of which are single pinion planetary gearsets, and the second compound planetary gearset is realized by the combination of the third simple planetary gearset, which is a double pinion planetary gearset, with the fourth simple planetary gearset, which is a single pinion planetary gearset.

The sun gear and ring gear of the first simple planetary gearset are fixedly connected respectively to the sun gear and ring gear of the second simple planetary gearset.

The first operating element is a combination of the sun gears of the first simple planetary gearset; the second operating element is the planet carrier of the first simple planetary gearset; the third operating element is the planet carrier of the second simple planetary gearset; and the fourth operating element is a combination of the ring gears of the first and second simple planetary gearsets.

The planet carrier and ring gear of the first simple planetary gearset are fixedly connected respectively to the ring gear and sun gear of the second simple planetary gearset.

The first operating element is the sun gear of the first simple planetary gearset; the second operating element is a combination of the planet carrier and ring gear of the first and second simple planetary gearsets; the third operating element is the planet carrier of the second simple planetary gearset; and the fourth operating element is a combination of the ring gear and sun gear of the first and second simple planetary gearsets.

The sun gear and planet carrier of the first simple planetary gearset are fixedly connected respectively to the ring gear and planet carrier of the second simple planetary gearset.

The first operating element is the sun gear of the second simple planetary gearset; the second operating element is the ring gear of the first simple planetary gearset; the third operating element is a combination of the planet carriers of the first and second simple planetary gearsets; and the fourth operating element is a combination of the sun gear and ring gear of the first and second simple planetary gearsets.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The first compound planetary gearset is realized by the combination of the first simple planetary gearset, which is a double pinion planetary gearset, with the second simple planetary gearset, which is a single pinion planetary gearset, and the second compound planetary gearset is realized by the combination of the third simple planetary gearset, which is a double pinion planetary gearset, with the fourth simple planetary gearset, which is a single pinion planetary gearset.

The sun gear and planet carrier of the first simple planetary gearset are fixedly connected respectively to the sun gear and ring gear of the second simple planetary gearset.

The first operating element is a combination of the sun gears of the first and second simple planetary gearsets; the second operating element is the ring gear of the first simple planetary gearset; the third operating element is the planet carrier of the second simple planetary gearset; and the fourth operating element is a combination of the planet carrier and ring gear of the first and second simple planetary gearsets.

The sun gear and ring gear of the first simple planetary gearset are fixedly connected respectively to the ring gear and planet carrier of the second simple planetary gearset.

The first operating element is the sun gear of the second simple planetary gearset; the second operating element is the planet carrier of the first simple planetary gearset; the third operating element is a combination of the ring gear and planet carrier of the first and second simple planetary gearsets; and the fourth operating element is a combination of the sun gear and ring gear of the first and second simple planetary gearsets.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The first compound planetary gearset is realized by the combination of the first simple planetary gearset, which is a single pinion planetary gearset, with the second simple planetary gearset, which is a double pinion planetary gearset, and the second compound planetary gearset is realized by the combination of the third simple planetary gearset, which is a double pinion planetary gearset, with the fourth simple planetary gearset, which is a single pinion planetary gearset.

The planet carrier and ring gear of the first simple planetary gearset are fixedly connected respectively to the planet carrier and ring gear of the second simple planetary gearset.

The first operating element is the sun gear of the first simple planetary gearset; the second operating element is the combination of the planet carriers of the first and second simple planetary gearsets; the third operating element is the ring gear of the second simple planetary gearset; and the fourth operating element is a combination of the ring gear of the first simple planetary gearset and the sun gear of the second simple planetary gearset.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The planet carrier and ring gear of the third simple planetary gearset are fixedly connected respectively to the planet carrier and sun gear of the fourth simple planetary gearset.

The fifth operating element is the sun gear of the third simple planetary gearset; the sixth operating element is the ring gear of the fourth simple planetary gearset; the seventh operating element is a combination of the planet carriers of the third and fourth simple planetary gearsets; and the eighth operating element is a combination of the ring gear and sun gear of the third and fourth simple planetary gearsets.

The clutch means comprises a first clutch interposed between a combination of ring gears of the first simple planetary gearset and a combination of a sun gear and a ring gear of the third and fourth simple planetary gearsets, and a second clutch interposed between a combination of the ring gears of the first simple planetary gearset and a planet carrier of the fourth simple planetary gearset.

The brake means comprises a first brake for fixing one of the first, second, third, and fourth operating elements and a second brake for fixing one of the fifth, sixth, seventh, and eighth operating elements.

BRIEF DESCRIPTION OF THE DRAWINGS

These and other features, aspects, and advantages of the present invention will become better understood with regard to the following description, appended claims, and accompanying drawings where:

FIG. 5 is a chart illustrating the operation of friction elements in each shift range of a powertrain according to a preferred embodiment of the present invention;

DETAILED DESCRIPTION OF THE PREFERRED EMBODIMENTS

In the following detailed description, only the preferred embodiments of the invention have been shown and described, simply by way of illustration of the best mode contemplated by the inventor of carrying out the invention. As will be realized, the invention is capable of modification in various obvious respects, all without departing from the invention. Accordingly, the drawings and description are to be regarded as illustrative in nature, and not restrictive.

Figure 1:
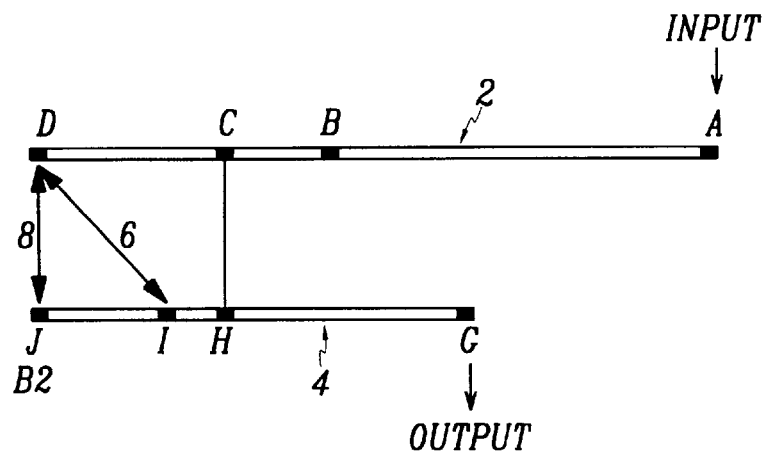
FIG. 1 is a lever analogy representation which can be obtained through powertrains according to various embodiments of the present invention.

Referring first to FIG. 1, shown is a lever analogy representation which can be obtained through powertrains according to various embodiments of the present invention. The inventive powertrain comprises first and second compound planetary gearsets 2 and 4, combined to realize five forward speeds and one reverse speed.

Each of the first and second compound planetary gearsets 2 and 4 is formed by the combination of two simple planetary gearsets, and each simple planetary gearset fixedly connects two operating elements for a total of eight operating elements arranged in two groups of four- A, B, C, D and G, H, I, J- for each of the compound planetary gearsets 2 and 4.

To combine the first and second compound planetary gearsets 2 and 4, one operating element of the first compound planetary gearset 2 is fixedly connected to one operating element of the second compound planetary gearset 4, and two of the operating elements of the second compound planetary gearset 4 are variably connected to one operating element of the first compound planetary gearset 2 through clutch means.

Describing in more detail, a first operating element A of the first compound planetary gearset 2 operates as an input element, a third operating element C of the first compound planetary gearset 2 is fixedly connected to a second operating element H of the second compound planetary gearset 4, and a fourth operating element D of the first compound planetary gearset 2 is variably connected both to a third operating element I of the second compound planetary gearset 4 by a first clutch 6, and to a fourth operating element J of the second compound planetary gearset 4 by a second clutch 8. A first operating element G of the second planetary gearset 4 acts as an output element.

In addition, a second operating element B of the first planetary gearset 2 and the fourth operating element J of the second planetary gearset 4 are selectively operated as reacting elements through engagement of brakes (to be described in more detail hereinafter).

Figure 2:
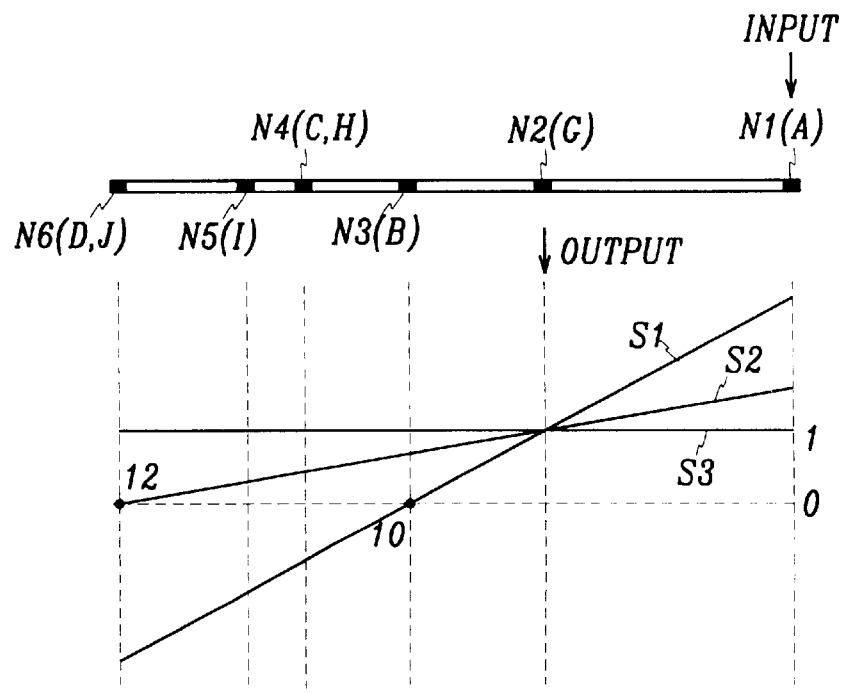
FIG. 2 is a schematic diagram illustrating an operation of forward first, second, and third speeds of a powertrain according to a preferred embodiment of the present invention through a lever analogy.

On the basis of the above description, the first and second compound planetary gearsets 2 and 4 can be merged into a single lever as shown in FIG. 2, the lever having first through sixth nodes N1, N2, N3, N4, N5, and N6 representing the operating elements of the first and second compound planetary gearsets 2 and 4. The lever analogy of FIG. 2 is used to illustrate the operation of the inventive powertrain in forward first, second, and third speeds. The first clutch 6 is engaged in all of these three speeds.

Describing in more detail with reference to the drawing, the first node N1 indicates the first operating element A of the first compound planetary gearset 2, the second node N2 indicates the first operating element G of the second compound planetary gearset 4, the third node N3 indicates the second operating element B of the first compound planetary gearset 2, the fourth node N4 indicates the third operating element C of the first compound planetary gearset 2 and the second operating element H of the second planetary gearset 4, the fifth node N5 indicates the third operating element I of the second compound planetary gearset 4, and the sixth node N6 indicates the fourth operating element J of the second compound planetary gearset 4 and the fourth operating element D of the first compound planetary gearset 2.

As shown in the chart of FIG. 5, illustrating the operation of friction elements in each shift range, in the forward first speed the first clutch 6 and a first brake 10 are engaged. Referring back to FIG. 2, in a state where input is realized through the first node N1, the third node N3 operates as a reacting element by the engagement of the first brake 10.

Also in FIG. 2, when assuming the number of output revolutions is "1", a line connecting the third node N3 (a reacting element) with the second node N2 (an output element) at this level of output revolutions becomes a first speed line S1. Accordingly, the number of revolutions input through the first node N1 is substantially higher than output revolutions.

Further, in the forward second speed the first brake 10 is disengaged, while a second brake 12 is operated (see FIG. 5). Here, in a state where input is realized through the first node N1, the sixth node N6 operates as a reacting element by the engagement of the second brake 10.

When assuming the number of output revolutions is "1", a line connecting the sixth node N6 (reacting element) to the second node N2 (output element) becomes a second speed line S2. As can be seen in the line S2, the number of revolutions input through the first node N1 is somewhat lower compared to when in the first speed.

In the second speed state, the third, fourth, and fifth nodes N3, N4, and N5 rotate in the input direction at a number of revolutions less than that of output.

In the forward third speed the second brake 12 is disengaged, while the second clutch 8 is operated such that the two clutches 6 and 8 are engaged in this speed (see FIG. 5). Here, in a state where input is realized through the first node N1, the first and second compound planetary gearsets 2 and 4 become locked in direct drive such that a 1:1 ratio is realized between input and output. Namely, neither a state of gear reduction nor overdrive is realized.

In the forward fourth and fifth speeds, the first clutch 6 is disengaged, the second clutch 8 is engaged, and either the first or second brake 10 and 12 is engaged, respectively.

Figure 3:
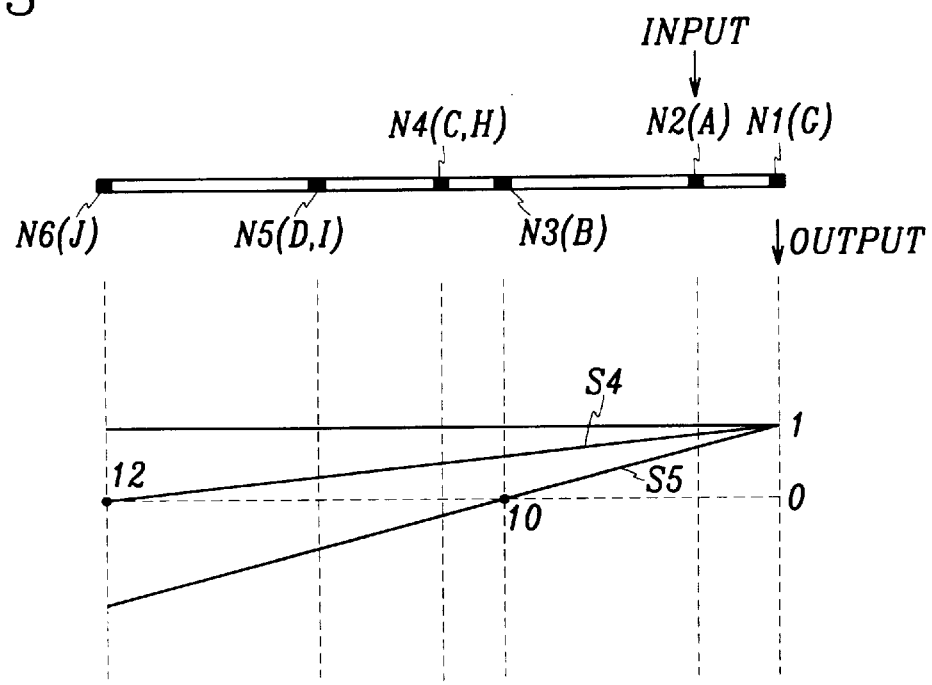
FIG. 3 is a schematic diagram illustrating an operation of forward fourth and fifth speeds of a powertrain according to a preferred embodiment of the present invention through a lever analogy.

Accordingly, the first and second compound planetary gearsets 2 and 4 can be merged into a single lever having first to sixth nodes N1, N2, N3, N4, N5, and N6 as shown in FIG. 3. That is, in the lever of FIG. 3, the first node N1 indicates the first operating element G of the second compound planetary gearset 4, the second node N2 indicates the first operating element A of the first compound planetary gearset 2, the third node N3 indicates the second operating element B of the first compound planetary gearset 2, the fourth node N4 indicates the third operating element C of the first compound planetary gearset 2 and the second operating element H of the second compound planetary gearset 4, the fifth node N5 indicates the fourth operating element D of the first planetary gearset 2 and the third operating element I of the second compound planetary gearset 4, and the sixth node N6 indicates the fourth operating element J of the second planetary gearset 4.

Therefore, in the fourth speed, when assuming the number of output revolutions is "1" in a state where input is realized through the second node N2, a line connecting the sixth node N6, operating as a reacting element by the operation of the second brake 12, with the first node N1 becomes a fourth speed line S4. Accordingly, the number of revolutions input through the second node N2 is substantially lower than output revolutions, indicating the realization of an overdrive state.

Also, because the third, fourth, and fifth nodes N3, N4, and N5 rotate at a rate slower than output, an operating element rotating faster than output is not need as in the prior art such that power loss is prevented.

In the forward fifth speed, the second brake 12 is disengaged, while the first brake 10 is engaged. Accordingly, in a state where input is realized through the second node N2, when assuming the number of output revolutions is "1", a line connecting the third node N3, operating as a reacting element by the operation of the first brake 10, with the first node N1, operating as an output element, becomes a fifth speed line S5. Here, an overdrive state is realized as in the forward fourth speed.

In the reverse range, the first and second clutches 6 and 8 are disengaged, while the first and second brakes 10 and 12 are engaged. Accordingly, as shown in FIG. 4, the second operating element B of the first compound planetary gearset 2 and the fourth operating element J of the second planetary gearset 4 become reacting elements such that the first operating element A of the first compound planetary gearset 2 comes to be located at an opposite position in the lever of FIG. 4, the lever having first to sixth nodes N1, N2, N3, N4, N5, and N6.

In the lever, the first node N1 indicates the fourth operating element D of the first compound planetary gearset 2, the second node N2 indicates the first operating element G of the second compound planetary gearset 4, the third node N3 indicates the third operating element C of the first compound planetary gearset 2 and the second operating element H of the second compound planetary gearset 4, the fourth node N4 indicates the third operating element I of the second compound planetary gearset 4, the fifth node N5 indicates the second operating element B of the first planetary gearset 2 and the fourth operating element J of the second compound planetary gearset 4, and the sixth node N6 indicates the first operating element A of the first planetary gearset 2.

Therefore, in the reverse range where input is realized through the sixth node N6 and the fifth node N5 acts as an output element by the engagement of the first and second brakes 10 and 12, when assuming the number of output revolutions is "1", a line connecting the fifth node N5, operating as a reacting element, with the first node N1 becomes a reverse speed line S6.

Figure 4:
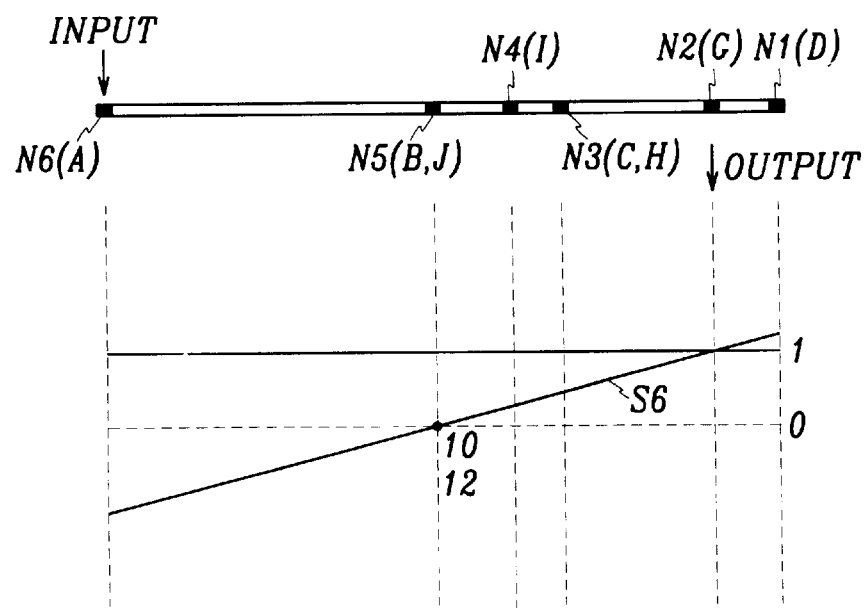
FIG. 4 is a schematic diagram illustrating an operation of a reverse speed of a powertrain according to a preferred embodiment of the present invention through a lever analogy.

In FIG. 4, input below "0" does not indicate input in the reverse direction. This is merely a result of selecting the random number of output revolution of "1".

The embodiments of the present invention operating as in the above will be explained hereinafter with reference to the drawings.

First Embodiment

Figure 6:
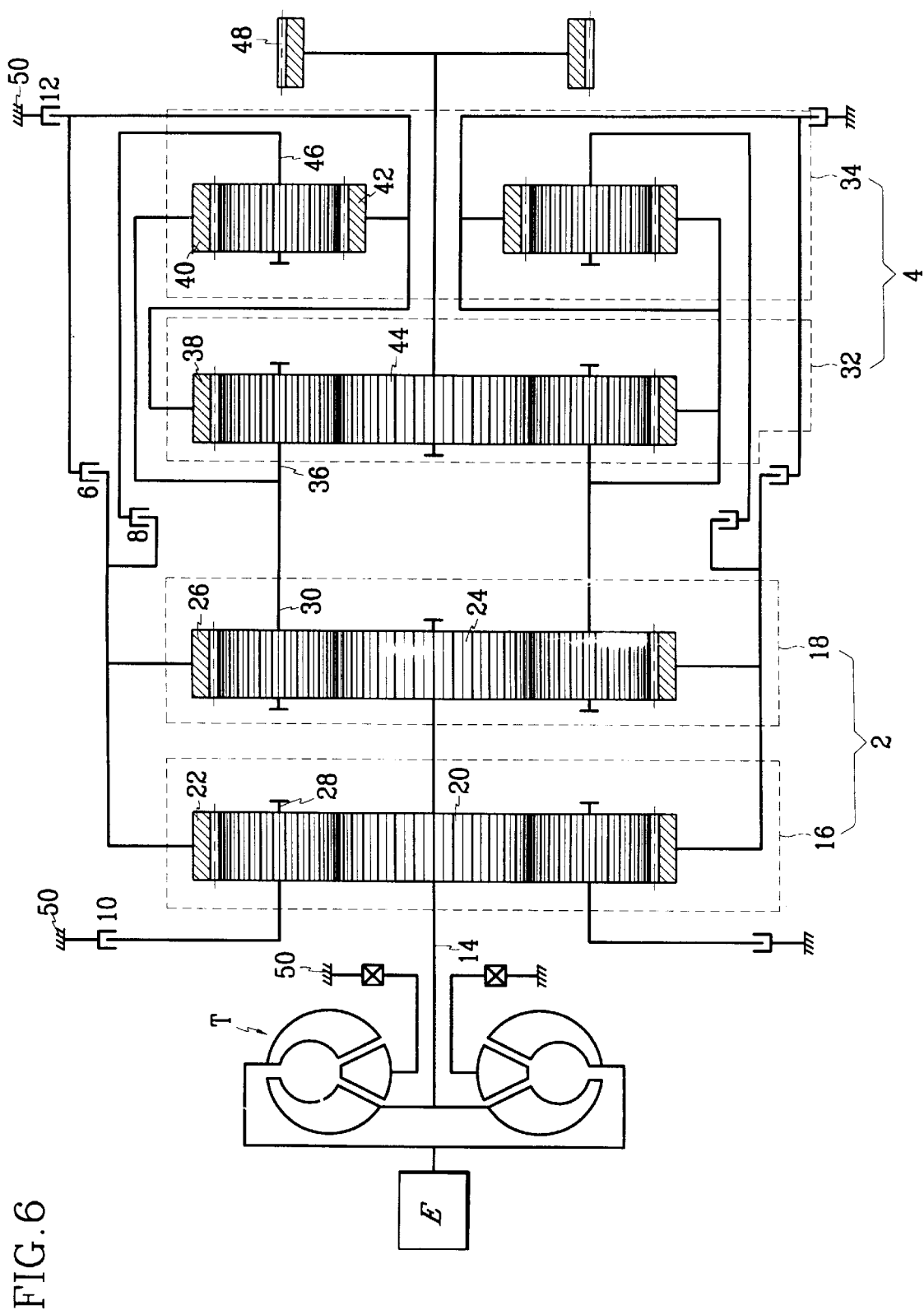
FIG. 6 is a schematic view of a powertrain according to a first preferred embodiment of the present invention.

Referring to FIG. 6, the inventive powertrain comprises an engine E for generating power, a torque converter T for multiplying torque generated from the engine E, and the first and second compound planetary gearsets 2 and 4 for receiving rotational power through an input shaft 14 and for outputting five forward speeds and one reverse speed.

The first compound planetary gearset 2 is realized through the combination of a first simple planetary gearset 16 and a second simple planetary gearset 18. In the present invention, the first and second simple planetary gearsets 16 and 18 are single pinion planetary gearsets.

A sun gear 20 and a ring gear 22 of the first simple planetary gearset 16 are fixedly connected respectively to a sun gear 24 and a ring gear 26 of the second simple planetary gearset 18. Together with these two connections, and a planet carrier 28 of the first simple planetary gearset 16 and a planet carrier 30 of the second simple planetary gearset 18, four operating elements are provided.

The second compound planetary gearset 4 is realized through the combination of a third simple planetary gearset 32 and a fourth simple planetary gearset 34, both of which are single pinion planetary gearsets.

A planet carrier 36 and a ring gear 38 of the third simple planetary gearset 32 are fixedly connected respectively to a ring gear 40 and a sun gear 42 of the fourth simple planetary gearset 34. Together with these two connections, and a sun gear 44 of the third simple planetary gearset 32 and a planet carrier 46 of the fourth simple planetary gearset 34, four operating elements are provided.

With regard to the combination of the first and second compound planetary gearsets 2 and 4, the planet carrier 30 of the second simple planetary gearset 18 is fixedly connected to both the planet carrier 36 of the third simple planetary gearset 32 and the ring gear 40 of the fourth simple planetary gearset 34, and both the ring gears 22 and 26 of the first and second simple planetary gearsets 16 and 18 are variably connected to both the ring gear 38 and sun gear 42 of the third and fourth simple planetary gearsets 32 and 34 through the first clutch 6, and to the planet carrier 46 of the fourth simple planetary gearset 34 through the second clutch 8.

Accordingly, the sun gears 20 and 24 of the first and second simple planetary gearsets 16 and 18 act as input elements, while the sun gear 44 of the third simple planetary gearset 32 acts as an output element, an output gear 48 being integrally formed with the sun gear 44.

Here, because the structure and operation of the output gear 48 is well known, i.e., its differential function through a final reduction gear, an explanation thereof and illustration in FIG. 6 have been omitted.

Further, the clutch means interposed in the variable connections above is realized through the first clutch 6 connecting the ring gears 22 and 26 of the first and second simple planetary gearsets 16 and 18 to the ring gear 38 and sun gear 42 of the third and fourth planetary gearsets 32 and 36 when in the forward first, second, and third speeds; and the second clutch 8 connecting the ring gears 22 and 26 of the first and second simple planetary gearsets 16 and 18 to the planet carrier 46 of the fourth simple planetary gearset 34 in forward third, fourth, and fifth speeds.

Also, brake means, selectively enabling one of the operating elements forming the first and second compound planetary gearsets 2 and 4 to act as a reaction element, comprises the first brake 10 connecting the planet carrier 28 of the first simple planetary gear set 16 to a transmission housing 50 in forward first and fifth speeds and in reverse, and the second brake 20 for connecting the ring gear 38 and sun gear 42 of the third and fourth simple planetary gearsets 32 and 34 to the transmission housing 50 in forward second and fourth speeds and in reverse.

Referring back to FIG. 1, with regard to the first compound planetary gearset 2, the first operating element A indicates the sun gears 20 and 24 of the first and second simple planetary gearsets 16 and 18, the second operating element B indicates the planet carrier 28 of the first simple planetary gearset 16, the third operating element C indicates the planet carrier 30 of the second simple planetary gearset 18, and the fourth operating element D indicates the ring gears 22 and 26 of the first and second simple planetary gearsets 16 and 18.

With regard to the second compound planetary gearset 4, the first operating element G indicates the sun gear 44 of the third simple planetary gearset 32, the second operating element H indicates the planet carrier 36 and ring gear 40 of the third and fourth simple planetary gearsets 32 and 34, the third operating element I indicates the planet carrier 46 of the fourth simple planetary gearset 34, and the fourth operating element J indicates the ring gear 38 and sun gear 42 of the third and fourth simple planetary gearsets 32 and 34.

The establishment of each operating element is determined by the type of planetary gear unit and connecting structure. In the above, as the determining of the structural elements of the first through fourth operating elements of the first and second planetary gearsets 2 and 4 by the combination of the first and second simple planetary gearsets 16 and 18, and the combination of the third and fourth simple planetary gearsets 32 and 34 is well known, a detailed description thereof is omitted.

The lever analogy diagram of FIG. 1 can be further described in another lever analogy diagram in forward first, second, and third speeds as shown in FIG. 3, having six nodes, since the first clutch 6 is operated in the first, second, and third speeds. Using this as a basis, the forward first, second, and third speeds will be described in detail hereinbelow.

Forward First Speed

In the forward first speed, the first clutch 6 and the first brake 10 are engaged. Here, in a state where input is realized through the sun gears 20 and 24 of the first and second simple planetary gearsets 16 and 18, or the first node N1, the planet carrier 28 of the first simple planetary gearset 16, or the third node N3, acts as a reaction element by the operation of the first brake 10.

Accordingly, as shown in FIG. 2, when assuming that the number of output revolutions is "1", the line connecting the third node N3, or reacting element, to the second node N2, or output element, becomes the first speed line S1 such that the number of revolutions input through the first node N1 is substantially higher than output revolutions.

Forward Second Speed

In the forward second speed, the first brake 10 is disengaged, while the second brake 12 is engaged. Here, in a state where input is realized through the first node N1, the ring gears 22 and 26 of the first and second simple planetary gearsets 16 and 18, or the sixth node N6, and the ring gear 38 and sun gear 42 of the third and fourth simple planetary gearsets 32 and 34, come to act as reaction elements by the operation of the second brake 12.

Accordingly, as shown in FIG. 2, when assuming that the number of output revolutions is "1", the line connecting the sixth node N6, or reacting element, to the second node N2, or output element, becomes the second speed line S2 such that the number of revolutions input is less than that of the first speed.

Forward Third Speed

In the forward third speed, the second brake 12 is disengaged, while the second clutch is engaged such that both clutches 6 and 8 are operating. Here, in a state where input is realized through the first node N1, the first and second compound planetary gearsets 2 and 4 become locked in direct drive such that a 1:1 ratio is realized between input and output. That is, neither a state of gear reduction nor overdrive is realized.

Forward Fourth Speed

In the forward fourth and fifth speeds, the first clutch 6 is disengaged, the second clutch 8 is engaged, and either the first or second brake 10 and 12 is engaged. As a result, the fourth operating element D of the first compound planetary gearset 2 and the third operating element I of the second compound planetary gearset 4 are connected.

Accordingly, the first and second compound planetary gearsets 2 and 4 can be merged into a single lever having first to sixth nodes N1, N2, N3, N4, N5, and N6 as shown in FIG. 3. That is, in the lever of FIG. 3, the first node N1 indicates the first operating element G of the second compound planetary gearset 4, the second node N2 indicates the first operating element A of the first compound planetary gearset 2, the third node N3 indicates the second operating element B of the first compound planetary gearset 2, the fourth node N4 indicates the third operating element C of the first compound planetary gearset 2 and the second operating element H of the second compound planetary gearset 4, the fifth node N5 indicates the fourth operating element D of the first planetary gearset 2 and the third operating element I of the second compound planetary gearset 4, and the sixth node N6 indicates the fourth operating element J of the second planetary gearset 4.

Therefore, in the fourth speed, when assuming the number of output revolutions is "1" in a state where input is realized through the second node N2, a line connecting the sixth node N6, operating as a reacting element by the operation of the second brake 12, with the first node N1 becomes a fourth speed line S4. Accordingly, the number of revolutions input through the second node N2 is substantially lower than output revolutions, indicating the realization of an overdrive state.

Also, because the third, fourth, and fifth nodes N3, N4, and N5 rotate at a rate slower than output, an operating element rotating faster than output is not need as in the prior art such that power loss is prevented.

Forward Fifth Speed

In the forward fifth speed, the second brake 12 is disengaged, while the first brake 10 is engaged. Accordingly, in a state where input is realized through the second node N2, when assuming the number of output revolutions is "1", a line connecting the third node N3, operating as a reacting element by the operation of the first brake 10, with the first node N1, operating as an output element, becomes a fifth speed line S5. Here, an overdrive state is realized as in the forward fourth speed.

Reverse

In the reverse range, the first and second clutches 6 and 8 are disengaged, while the first and second brakes 10 and 12 are engaged. Accordingly, as shown in FIG. 4, the second operating element B of the first compound planetary gearset 2 and the fourth operating element J of the second planetary gearset 4 become reacting elements such that the first operating element A of the first compound planetary gearset 2 comes to be located at an opposite position in the lever of FIG. 4, the lever having first to sixth nodes N1, N2, N3, N4, N5, and N6.

In the lever, the first node N1 indicates the fourth operating element D of the first compound planetary gearset 2, the second node N2 indicates the first operating element G of the second compound planetary gearset 4, the third node N3 indicates the third operating element C of the first compound planetary gearset 2 and the second operating element H of the second compound planetary gearset 4, the fourth node N4 indicates the third operating element I of the second compound planetary gearset 4, the fifth node N5 indicates the second operating element B of the first planetary gearset 2 and the fourth operating element J of the second compound planetary gearset 4, and the sixth node N6 indicates the first operating element A of the first planetary gearset 2.

Therefore, in the reverse range where input is realized through the sixth node N6 and the fifth node N5 acts as an output element by the engagement of the first and second brakes 10 and 12, when assuming the number of output revolutions is "1", a line connecting the fifth node N5, operating as a reacting element, with the first node N1 becomes a reverse speed line S6.

In the FIG. 4, input below "0" does not indicate input in the reverse direction. This is merely a result of selecting the random number of output revolution of "1".

Second Embodiment

Figure 7:
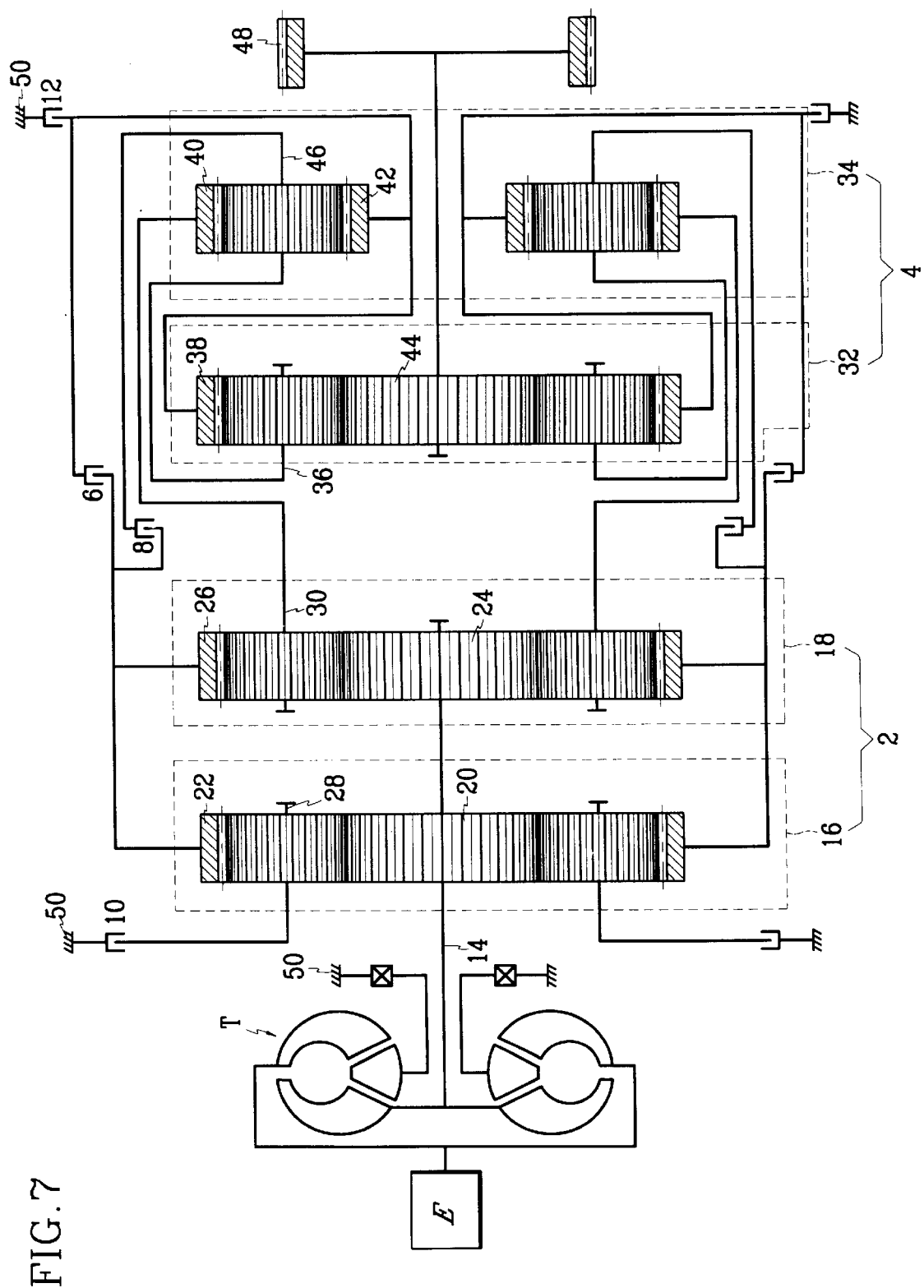
FIG. 7 is a schematic view of a powertrain according to a second preferred embodiment of the present invention.

Referring to FIG. 7, shown is a schematic view of a powertrain according to a second preferred embodiment of the present invention. As shown in the drawing, the planet carrier 36 and ring gear 38 of the third simple planetary gearset 32 are fixedly connected to the planet carrier 46 and sun gear 42 of the fourth simple planetary gearset 34, respectively.

Further, with regard to the combination of the first and second compound planetary gearsets 2 and 4, the ring gear 40 of the fourth simple planetary gearset 34 is fixedly connected to the planet carrier 30 of the second simple planetary gearset 18, the ring gear 38 and sun gear 42 of the third and fourth simple planetary gearsets 32 and 34 are variably connected to both the ring gears 22 and 26 of the first and second simple planetary gearsets 16 and 18 through the first clutch 6, and the planet carriers 36 and 46 of the third and fourth simple planetary gearsets 32 and 34 are variably connected to both the ring gears 22 and 26 of the first and second simple planetary gearset 16 and 18 by the second clutch 8.

Also, the second brake 12 is interposed between a combination of the ring gear 38 and sun gear 42 of the third and fourth simple planetary gearsets 32 and 34 and the transmission housing 50 such that the combination of the ring gear 38 and sun gear 42 selectively acts as a reacting element. In addition, the sun gear 44 of the third simple planetary gearset 32 acts as an output element.

According to the above structure, operating elements for the second compound planetary gearset 4 in the lever analogies of FIGS. 1–4 are as follows: the first operating element G indicates the sun gear 44 of the third simple planetary gearset 32, the second operating element H indicates the ring gear 40 of the fourth simple planetary gearset 34, the third operating element I indicates the planet carriers 36 and 46 of the third and fourth simple planetary gearsets 32 and 34, and the fourth operating element J indicates the ring gear 38 and sun gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the second embodiment, only the structure of the second compound planetary gearset 4 is changed from the first embodiment. As the operation of the operating elements in each shift range is identical to that of the first embodiment, an explanation thereof will be omitted herein.

Third Embodiment

Figure 8:
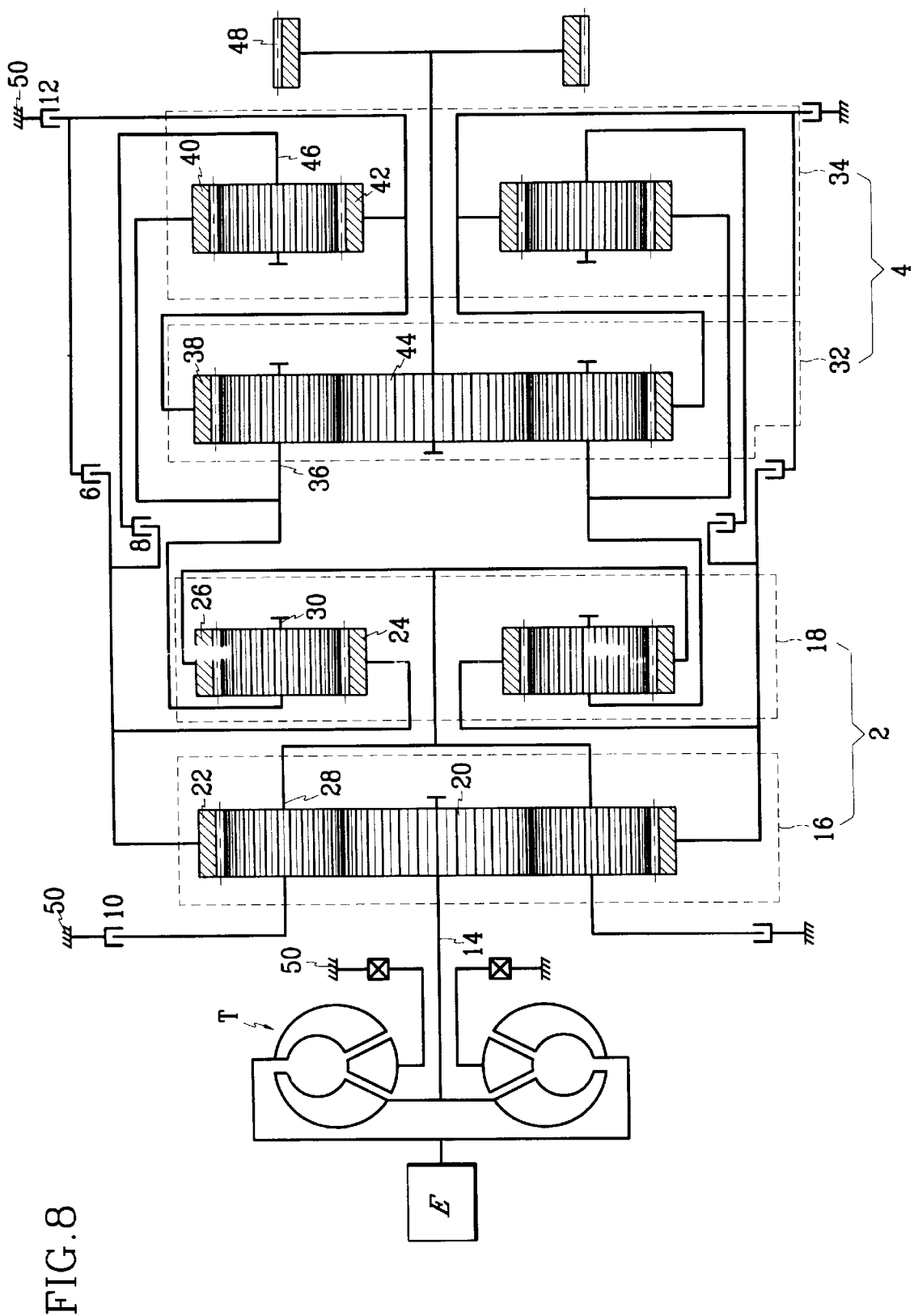
FIG. 8 is a schematic view of a powertrain according to third preferred embodiment of the present invention.

Referring to FIG. 8, shown is a schematic view of a powertrain according to a third preferred embodiment of the present invention. As shown in the drawing, the planet carrier 28 and ring gear 22 of the first simple planetary gearset 16 are fixedly connected to the ring gear 26 and sun gear 24 of the second simple planetary gearset 18, respectively.

Further, with regard to the combination of the first and second compound planetary gearsets 2 and 4, the planet carrier 30 of the second simple planetary gearset 18 is fixedly connected to the planet carrier 36 and ring gear 40 of the third and fourth simple planetary gearsets 32 and 34, and both the ring gear 22 and sun gear 24 of the first and second simple planetary gearsets 16 and 18 are variably connected to both the ring gear 38 and sun gear 42 of the third and fourth simple planetary gearsets 32 and 34 through the first clutch 6, and to the planet carrier 46 of the fourth simple planetary gearset 34 through the second clutch 8.

Also, the first brake 10 is interposed between a combination of the planet carrier 28 and ring gear 26 of the first and second simple planetary gearsets 16 and 18 and the transmission housing 50 such that the combination of the planet carrier 28 and ring gear 26 selectively acts as a reacting element. In addition, the sun gear 20 of the first simple planetary gearset 16 acts as an input element.

According to the above structure, operating elements for the first compound planetary gearset 2 in the lever analogies of FIGS. 1–4 are as follows: the first operating element A indicates the sun gear 20 of the first simple planetary gearset 16, the second operating element B indicates the planet carrier 28 and ring gear 26 of the first and second simple planetary gearsets 16 and 18, the third operating element C indicates the planet carrier 30 of the second simple planetary gearset 18, and the fourth operating element D indicates the ring gear 22 and sun gear 24 of the first and second simple planetary gearsets 16 and 18.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the third embodiment, only the structure of the first compound planetary gearset 2 is changed from the first embodiment. As the operation of the operating elements in each shift range is identical to that of the first embodiment, an explanation thereof will be omitted herein.

Fourth Embodiment

Figure 9:
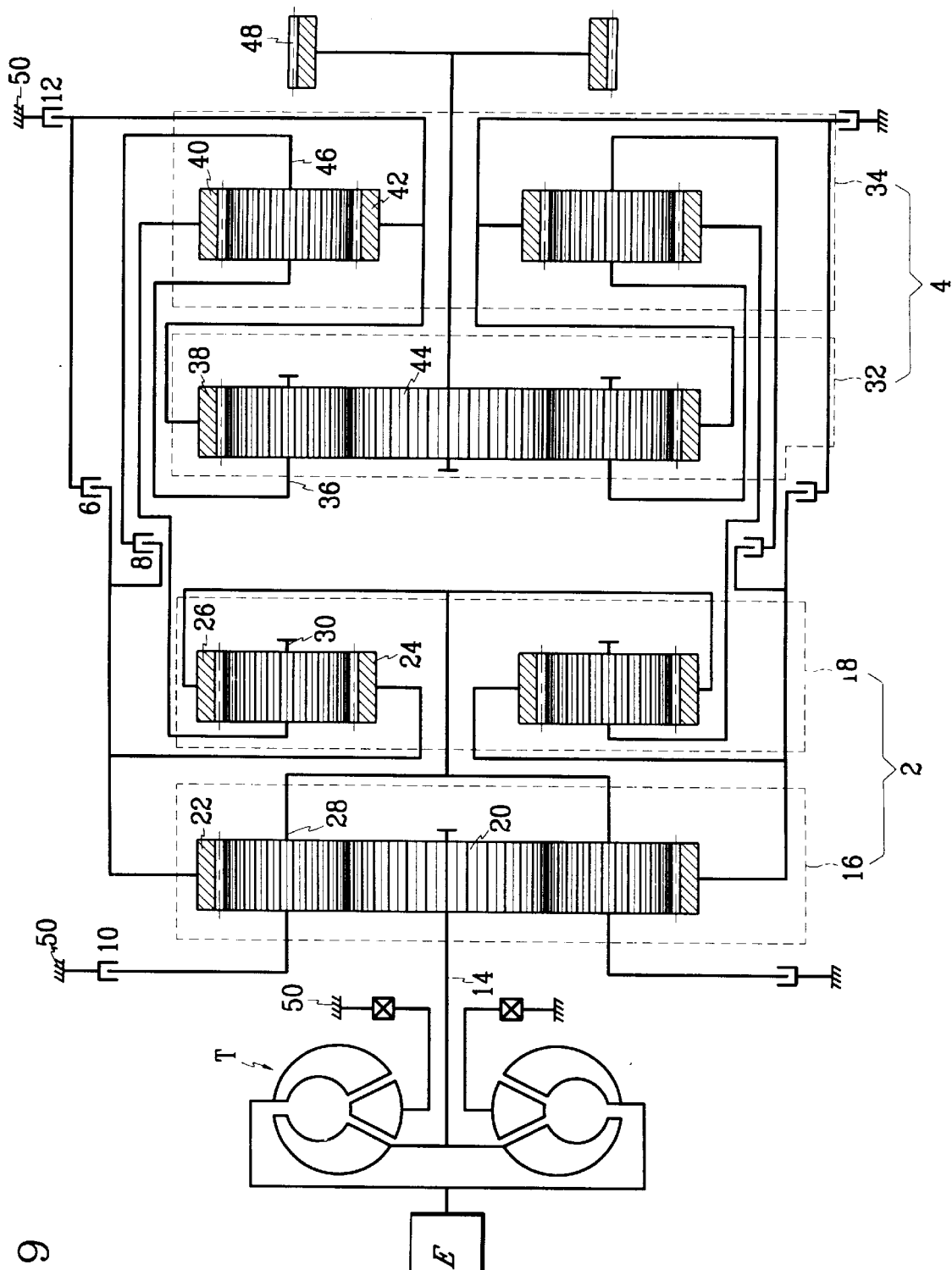
FIG. 9 is a schematic view of a powertrain according to a fourth preferred embodiment of the present invention.

Referring to FIG. 9, shown is a schematic view of a powertrain according to a fourth preferred embodiment of the present invention. As shown in the drawing, the planet carrier 36 and ring gear 38 of the third simple planetary gearset 32 are fixedly connected to the planet carrier 46 and sun gear 42 of the fourth simple planetary gearset 34, respectively.

Further, with regard to the combination of the first and second compound planetary gearsets 2 and 4, the ring gear 40 of the fourth simple planetary gearset 34 is fixedly connected to the planet carrier 30 of the second simple planetary gearset 18, and the planet carriers 36 and 46 of the third and fourth simple planetary gearsets 32 and 34 are both variably connected to the ring gear 22 and sun gear 24 of the first and second simple planetary gearsets 16 and 18.

Also, the second brake 12 is interposed between a combination of the ring gear 38 and sun gear 42 of the third and fourth simple planetary gearsets 32 and 34 and the transmission housing 50 such that the combination of the ring gear 38 and sun gear 42 acts as a reaction element. In addition, the sun gear 44 of the third simple planetary gearset 32 acts as an output element.

According to the above structure, operating elements for the second compound planetary gearset 4 in the lever analogies of FIGS. 1–4 are as follows: the first operating element G indicates the sun gear 44 of the third simple planetary gearset 32, the second operating element H indicates the ring gear 40 of the fourth simple planetary gearset 34, the third operating element I indicates the planet carriers 36 and 46 of the third and fourth simple planetary gearsets 32 and 34, and the fourth operating element J indicates the ring gear 38 and sun gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the fourth embodiment, only the structure of the second compound planetary gearset 4 is changed from the first embodiment. As the operation of the operating elements in each shift range is identical to that of the first embodiment, an explanation thereof will be omitted.

Fifth Embodiment

Figure 10:
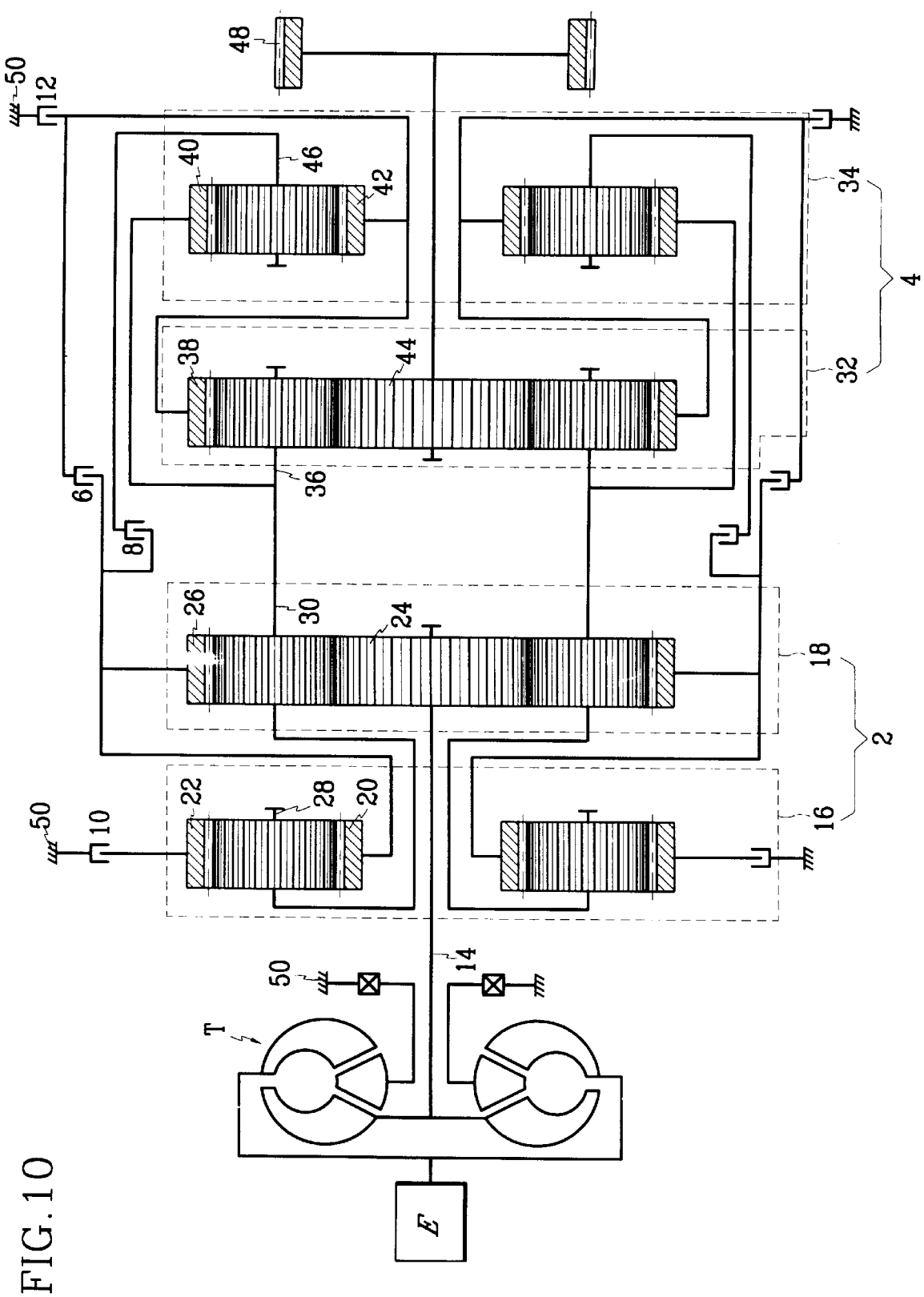
FIG. 10 is a schematic view of a powertrain according to a fifth preferred embodiment of the present invention.

Referring to FIG. 10, shown is a schematic view of a powertrain according to a fifth preferred embodiment of the present invention. As shown in the drawing, the planet carrier 28 and sun gear 20 of the first simple planetary gearset 16 are fixedly connected respectively to the planet carrier 30 and ring gear 26 of the second simple planetary gearset 18.

Further, with regard to the combination of the first and second compound planetary gearsets 2 and 4, the planet carriers 28 and 30 of the first and second simple planetary gearsets 16 and 18 are fixedly connected to the planet carrier 36 and ring gear 40 of the third and fourth simple planetary gearsets 32 and 34, and both the sun gear 20 and ring gear 26 of the first and second simple planetary gearsets 16 and 18 are variably connected to both the ring gear 38 and the sun gear 42 of the third and fourth simple planetary gearsets 32 and 34, and to the planet carrier 46 of the fourth simple planetary gearset 34.

Also, the first brake 10 is interposed between the ring gear 22 of the first simple planetary gearset 16 and the transmission housing 50 such that the ring gear 22 selectively acts as a reacting element. Further, the sun gear 24 of the second simple planetary gearset 18 acts as an input element.

According to the above structure, operating elements for the first compound planetary gearset 2 in the lever analogies of FIGS. 1–4 are as follows: the first operating element A indicates the sun gear 24 of the second simple planetary gearset 18, the second operating element B indicates the ring gear 22 of the first simple planetary gearset 16, the third operating element C indicates the planet carriers 28 and 30 of the first and second simple planetary gearset 16 and 18, and the fourth operating element D indicates the sun gear 20 and ring gear 26 of the first and second simple planetary gearsets 16 and 18.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the fifth embodiment, only the structure of the first and second compound planetary gearsets 2 and 4 is changed from the first embodiment. As the operation of the operating elements in each shift range is identical to that of the first embodiment, an explanation thereof will be omitted herein.

Sixth Embodiment

Figure 11:
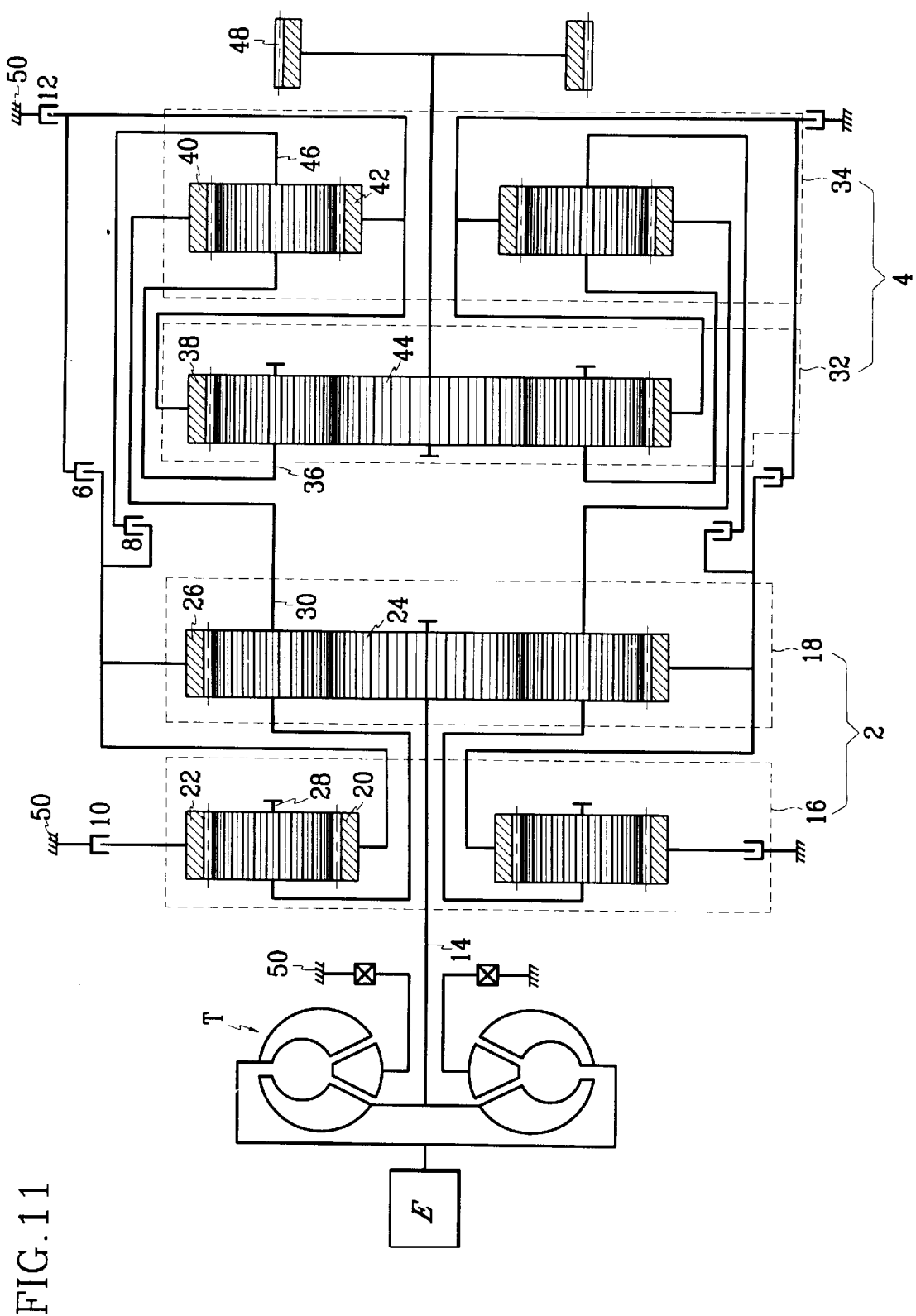
FIG. 11 is a schematic view of a powertrain according to sixth preferred embodiment of the present invention.

Referring to FIG. 11, shown is a schematic view of a powertrain according to a sixth preferred embodiment of the present invention. As shown in the drawing, the planet carrier 36 and ring gear 38 of the third simple planetary gearset 32 is fixedly connected to the planet carrier 46 and sun gear 42 of the fourth simple planetary gearset 34, respectively.

Further, with regard to the combination of the first and second compound planetary gearsets 2 and 4, the ring gear 40 of the fourth simple planetary gearset 34 is fixedly connected to the planet carriers 28 and 30 of the first and second simple planetary gearsets 16 and 18, and the planet carriers 36 and 46 are variably connected to the sun gear 20 and to the ring gear 26 of the first and second simple planetary gearsets 16 and 18.

Also, the second brake 12 is interposed between a combination of the ring gear 38 and sun gear 42 of the third and fourth simple planetary gearsets 32 and 34 and the transmission housing 50 such that the combination of the ring gear 38 and sun gear 42 selectively acts as a reacting element. Further, the sun gear 44 of the third simple planetary gearset 32 acts as an output element.

According to the above structure, operating elements for the second compound planetary gearset 4 in the lever analogies of FIGS. 1–4 are as follows: the first operating element G indicates the sun gear 44 of the third simple planetary gearset 32, the second operating element H indicates the ring gear 40 of the fourth simple planetary gearset 34, the third operating element I indicates the planet carriers 36 and 46 of the third and fourth simple planetary gearsets 32 and 34, and the fourth operating element J indicates the ring gear 38 and sun gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the sixth embodiment, only the structure of the second compound planetary gearset 4 is changed from the first embodiment. As the operation of the operating elements in each shift range is identical to that of the first embodiment, an explanation thereof will be omitted.

Seventh Embodiment

Figure 12:
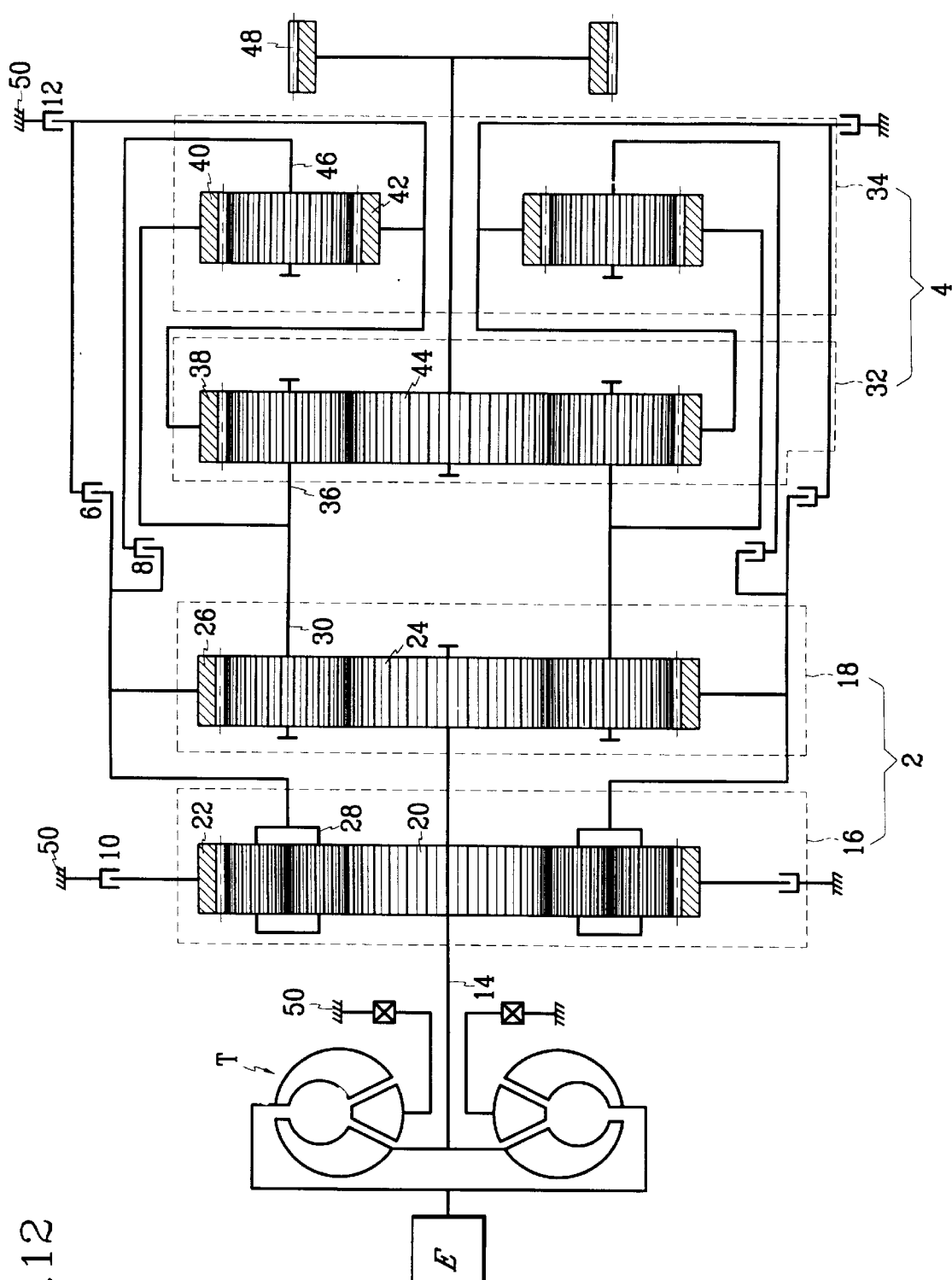
FIG. 12 is a schematic view of a powertrain according to a seventh preferred embodiment of the present invention.

Referring to FIG. 12, shown is a schematic view of a powertrain according to a seventh preferred embodiment of the present invention. In the drawing, the first compound planetary gearset 2 is formed by combining the first simple planetary gearset 16, which is a double pinion planetary gearset in this embodiment, with the second simple planetary gearset 18, which is a single pinion planetary gearset as in the first embodiment. The planet carrier 28 and sun gear 20 of the first simple planetary gearset 16 are fixedly connected respectively to the ring gear 26 and sun gear 24 of the second simple planetary gearset 18.

The second compound planetary gearset 4 is formed by the combination of the third and fourth simple planetary gearsets 32 and 34, both of which are single pinion planetary gearsets as in the first embodiment. Namely, the planet carrier 36 and ring gear 38 of the third simple planetary gearset 32 are fixedly connected respectively to the ring gear 40 and sun gear 42 of the fourth simple planetary gearset 34.

Further, with regard to the combination of the first and second compound planetary gearsets 2 and 4, the planet carrier 30 of the second simple planetary gearsets 18 is fixedly connected to the planet carrier 36 and ring gear 40 of the third and fourth simple planetary gearsets 32 and 34, and both the planet carrier 28 and ring gear 26 of the first and second simple planetary gearsets 16 and 18 are variably connected to the ring gear 38 and sun gear 42 of the third and fourth simple planetary gearsets 32 and 34 through the first clutch 6, and to the planet carrier 46 of the fourth simple planetary gearset 34 through the second clutch 8.

Also, the first brake 10 is interposed between the ring gear 22 of the first simple planetary gearset 16 and the transmission housing 50 such that the ring gear 22 selectively acts as a reacting element, and the second brake 12 is interposed between a combination of the ring gear 38 and sun gear 42 of the third and fourth simple planetary gearsets 32 and 34 and the transmission housing 50 such that the combination selectively acts as a reacting element. Further, the sun gear 44 of the third simple planetary gearset 32 acts as an output element.

According to the above structure, operating elements for the first compound planetary gearset 2 in the lever analogies of FIGS. 1–4 are as follows: the first operating element A indicates the sun gears 20 and 24 of the first and second simple planetary gearsets 16 and 18, the second operating element B indicates the ring gear 22 of the first simple planetary gearset 16, the third operating element C indicates the planet carrier 30 of the second simple planetary gearset 18, and the fourth operating element D indicates the planet carrier 28 and ring gear 26 of the first and second simple planetary gearsets 16 and 18.

Further, the operating elements for the second compound planetary gearset 4 in the lever analogies of FIGS. 1–4 are as follows: the first operating element G indicates the sun gear 44 of the third simple planetary gearset 32, the second operating element H indicates the planet carrier 36 and ring gear 40 of the third and fourth simple planetary gearsets 32 and 34, the third operating element I indicates the planet carrier 46 of the fourth simple planetary gearset 34, and the fourth operating element J indicates the ring gear 38 and sun gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the seventh embodiment, only the structure of the first and second compound planetary gearsets 2 and 4 is changed from the first embodiment. As the operation of the operating elements in each shift range is identical to that of the first embodiment, an explanation thereof will be omitted herein.

Eighth Embodiment

Figure 13:
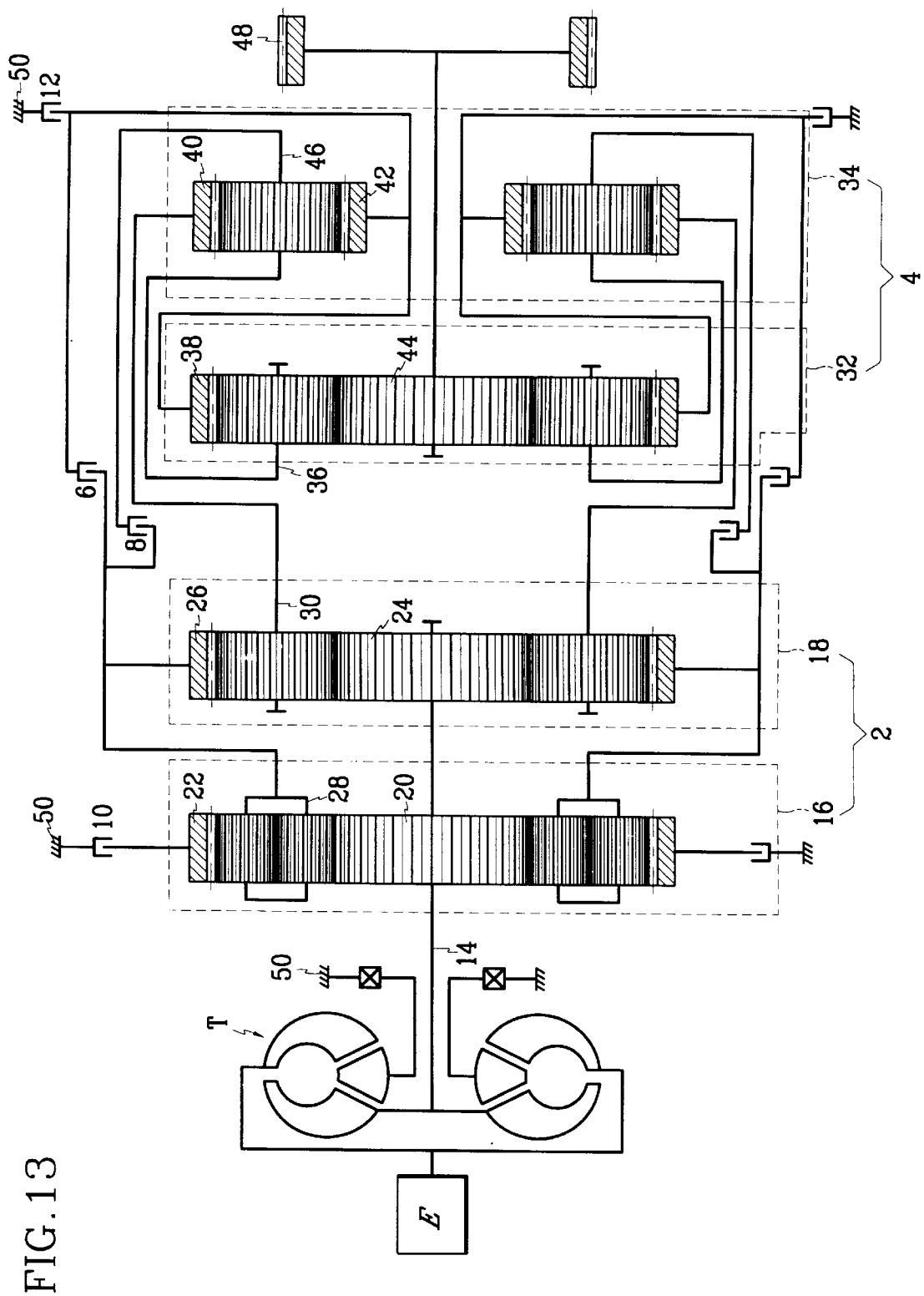
FIG. 13 is a schematic view of a powertrain according to a eighth preferred embodiment of the present invention.

Referring to FIG. 13, shown is a schematic view of a powertrain according to an eighth preferred embodiment of the present invention. As shown in the drawing, the planet carrier 36 and ring gear 38 of the third simple planetary gearset 32 are fixedly connected to the planet carrier 46 and sun gear 42 of the fourth simple planetary gearset 34, respectively.

Further, with regard to the combination of the first and second compound planetary gearsets 2 and 4, the ring gear 40 of the fourth simple planetary gearset 34 is fixedly connected to the planet carrier 30 of the second simple planetary gearset 18, both the ring gear 38 and sun gear 42 of the third and fourth simple planetary gearsets 32 and 34 are variably connected to both the planet carrier 28 and ring gear 26 of the first and second simple planetary gearset 16 and 18 through the first clutch 6, and both the planet carriers 36 and 46 of the third and fourth simple planetary gearsets 32 and 34 are variably connected to both the planet carrier 28 and ring gear 26 of the first and second planetary gearsets 16 and 18 through the second clutch 8.

Also, the second brake 12 is interposed between a combination of the ring gear 38 and sun gear 42 of the third and fourth simple planetary gearsets 32 and 34 and the transmission housing 50 such that the combination selectively acts as a reacting element. Further, the sun gear 44 of the third simple planetary gearset 32 acts as an output element.

According to the above structure, operating elements for the second compound planetary gearset 4 in the lever analogies of FIGS. 1–4 are as follows: the first operating element G indicates the sun gear 44 of the third simple planetary gearset 32, the second operating element H indicates the ring gear 40 of the fourth simple planetary gearset 34, the third operating element I indicates the planet carriers 36 and 46 of the third and fourth simple planetary gearsets 32 and 34, and the fourth operating element J indicates the ring gear 38 and sun gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the eighth embodiment, only the structure of the second compound planetary gearset 4 is changed from the first embodiment. As the operation of the operating elements in each shift range is identical to that of the first embodiment, an explanation thereof will be omitted.

Ninth Embodiment

Figure 14:
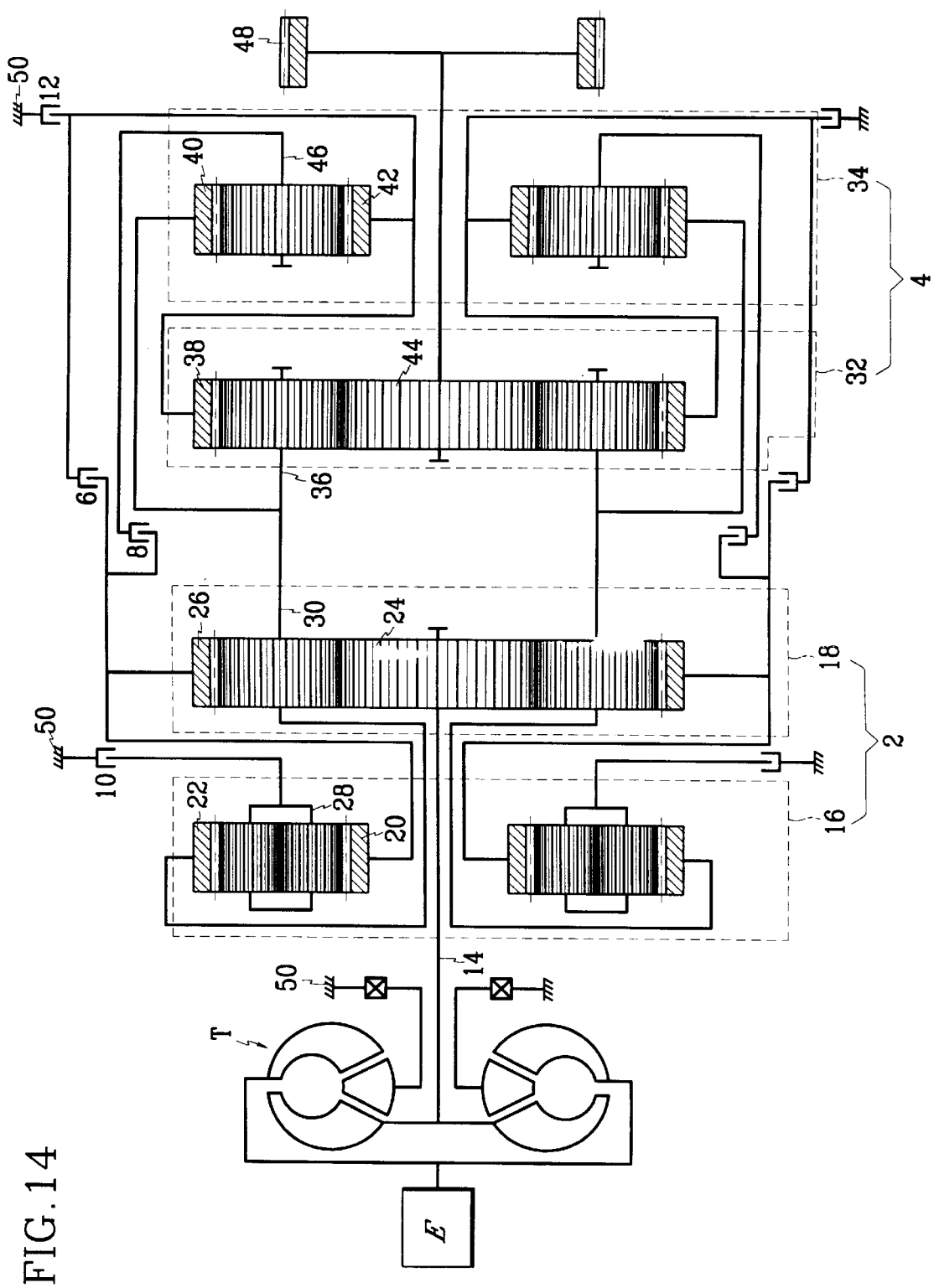
FIG. 14 is a schematic view of a powertrain according to a ninth preferred embodiment of the present invention.

Referring to FIG. 14, shown is a schematic view of a powertrain according to a ninth preferred embodiment of the present invention. As shown in the drawing, the sun gear 20 and ring gear 22 of the first simple planetary gearset 16 are fixedly connected respectively to the ring gear 26 and planet carrier 30 of the second simple planetary gearset 18.

Further, with regard to the combination of the first and second compound planetary gearsets 2 and 4, the ring gear 22 and planet carrier 30 of the first and second simple planetary gearsets 16 and 18 are fixedly connected to the planet carrier 36 and ring gear 40 of the third and fourth simple planetary gearsets 32 and 34, and both the sun gear 20 and ring gear 26 of the first and second simple planetary gearset 16 and 18 are variably connected to the ring gear 38 and sun gear 42 of the third and fourth simple planetary gearsets 32 and 34 through the first clutch 6, and to the planet carrier 46 of the fourth simple planetary gearset 34 through the second clutch 8.

Also, the planet carrier 28 of the first simple planetary gearset 16 is connected to the transmission housing 50 with the first brake 10 interposed therebetween such that the planet carrier 28 selectively acts as a reacting element. Further, the sun gear 24 of the second simple planetary gearset 18 acts as an input element.

According to the above structure, operating elements for the first compound planetary gearset 2 in the lever analogies of FIGS. 1–4 are as follows: the first operating element A indicates the sun gear 24 of the second simple planetary gearset 18, the second operating element B indicates the planet carrier 28 of the first simple planetary gearset 16, the third operating element C indicates the ring gear 22 and planet carrier 30 of the first and second simple planetary gearset 16 and 18, and the fourth operating element D indicates the sun gear 20 and ring gear 26 of the first and second simple planetary gearsets 16 and 18.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the ninth embodiment, only the structure of the first compound planetary gearset 2 is changed from the first embodiment. As the operation of the operating elements in each shift range is identical to that of the first embodiment, an explanation thereof will be omitted herein.

Tenth Embodiment

Figure 15:
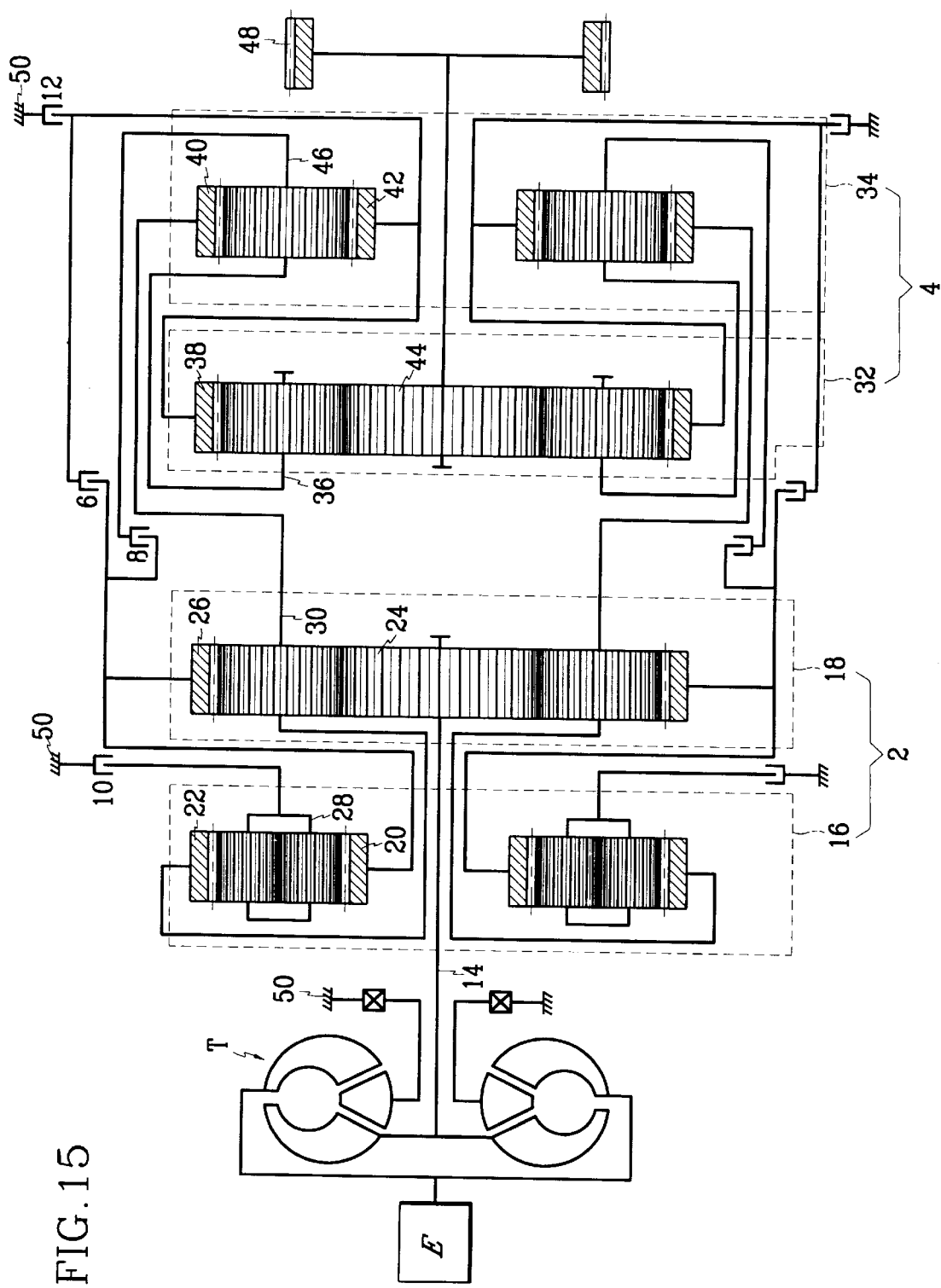
FIG. 15 is a schematic view of a powertrain according to a tenth preferred embodiment of the present invention.

Referring to FIG. 15, shown is a schematic view of a powertrain according to a tenth preferred embodiment of the present invention. As shown in the drawing, the planet carrier 36 and ring gear 38 of the third simple planetary gearset 32 are fixedly connected respectively to the planet carrier 46 and sun gear 42 of the fourth simple planetary gearset 34.

Further, with regard to the combination of the first and second compound planetary gearsets 2 and 4, the ring gear 40 of the fourth simple planetary gearset 34 is fixedly connected to the ring gear 22 and planet carrier 30 of the first and second simple planetary gearsets 16 and 18, both the ring gear 38 and sun gear 42 of the third and fourth simple planetary gearsets 32 and 34 are variably connected to both the sun gear 20 and ring gear 26 of the first and second simple planetary gearset 16 and 18 through the first clutch 6, and both the planet carriers 36 and 46 of the third and fourth simple planetary gearsets 32 and 34 are variably connected to both the sun gear 20 and ring gear 26 of the first and second planetary gearsets 16 and 18 through the second clutch 8.

Also, the second brake 12 is interposed between a combination of the ring gear 38 and sun gear 42 of the third and fourth simple planetary gearsets 32 and 34 and the transmission housing 50 such that the combination of the ring gear 38 and sun gear 42 selectively acts as a reacting element. In addition, the sun gear 44 of the third simple planetary gearset 32 acts as an output element.

According to the above structure, operating elements for the second compound planetary gearset 4 in the lever analogies of FIGS. 1–4 are as follows: the first operating element G indicates the sun gear 44 of the third simple planetary gearset 32, the second operating element H indicates the ring gear 40 of the fourth simple planetary gearset 34, the third operating element I indicates the planet carriers 36 and 46 of the third and fourth simple planetary gearsets 32 and 34, and the fourth operating element J indicates the ring gear 38 and sun gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the tenth embodiment, only the structure of the second compound planetary gearset 4 is changed from the first embodiment. As the operation of the operating elements in each shift range is identical to that of the first embodiment, an explanation thereof will be omitted.

Eleventh Embodiment

Figure 16:
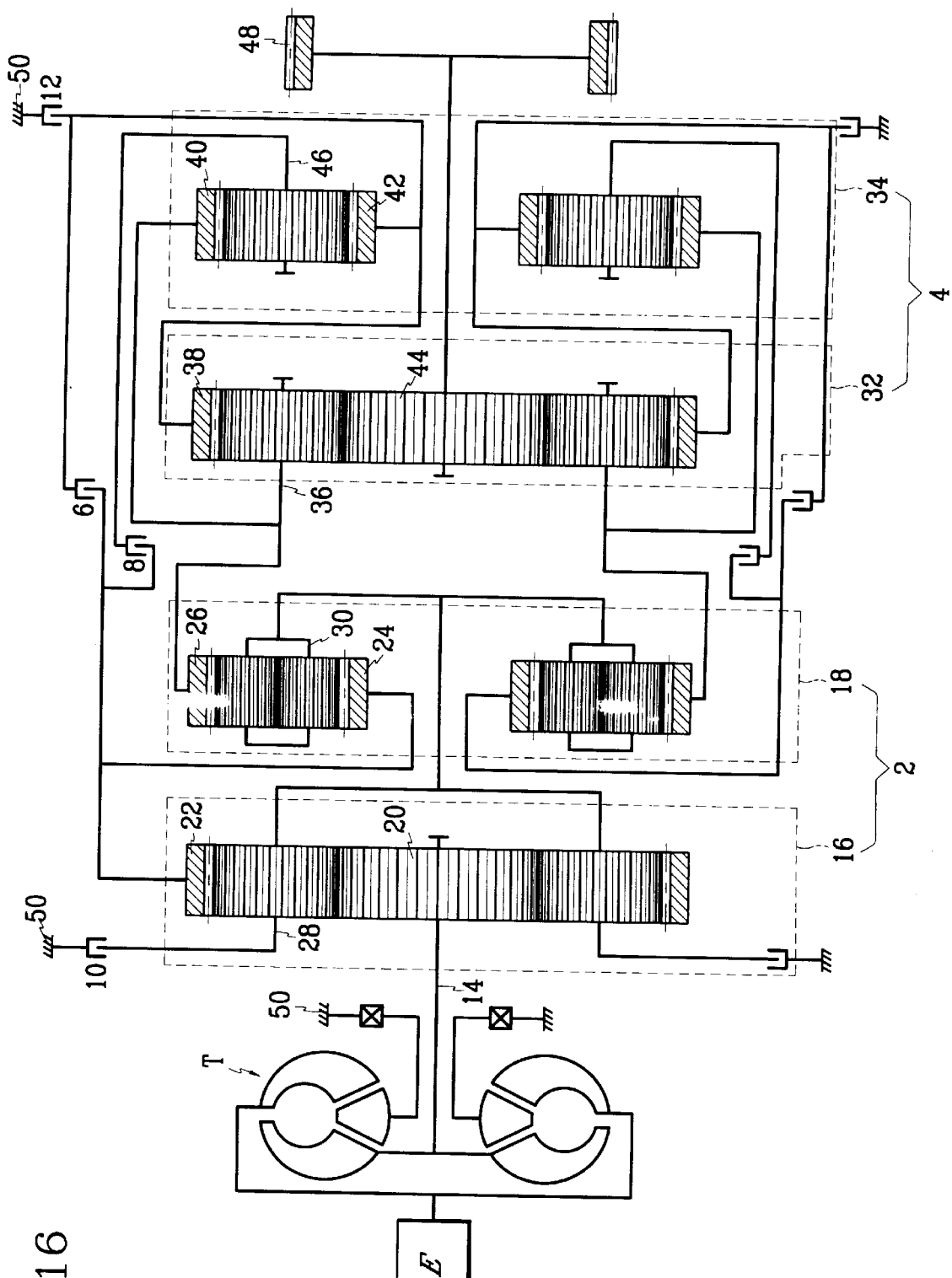
FIG. 16 is a schematic view of a powertrain according to a eleventh preferred embodiment of the present invention.

Referring to FIG. 16, shown is a schematic view of a powertrain according to an eleventh preferred embodiment of the present invention. In the drawing, the first compound planetary gearset 2 is formed by combining the first simple planetary gearset 16, which is a single pinion planetary gearset as in the first embodiment, with the second simple planetary gearset 18, which is a double pinion planetary gearset in this embodiment. The planet carrier 28 and ring gear 22 of the first simple planetary gearset 16 are fixedly connected respectively to the planet carrier 30 and sun gear 24 of the second simple planetary gearset 18.

The second compound planetary gearset 4 is formed by the combination of the third and fourth simple planetary gearsets 32 and 34, both of which are single pinion planetary gearsets as in the first embodiment. Namely, the planet carrier 36 and ring gear 38 of the third simple planetary gearset 32 are fixedly connected respectively to the ring gear 40 and sun gear 42 of the fourth simple planetary gearset 34.

Further, with regard to the combination of the first and second compound planetary gearsets 2 and 4, the ring gear 26 of the second simple planetary gearsets 18 is fixedly connected to the planet carrier 36 and ring gear 40 of the third and fourth simple planetary gearsets 32 and 34, and both the ring gear 22 and sun gear 24 of the first and second simple planetary gearsets 16 and 18 are variably connected to the ring gear 38 and sun gear 42 of the third and fourth simple planetary gearsets 32 and 34 through the first clutch 6, and to the planet carrier 46 of the fourth simple planetary gearset 34 through the second clutch 8.

Also, the first brake 10 is interposed between a combination of the planet carriers 28 and 30 of the first and second simple planetary gearsets 16 and 18 and the transmission housing 50 such that the combination selectively acts as a reacting element, and the second brake 12 is interposed between a combination of the ring gear 38 and sun gear 42 of the third and fourth simple planetary gearsets 32 and 34 and the transmission housing 50 such that the combination selectively acts as a reacting element. Further, the sun gear 44 of the third simple planetary gearset 32 acts as an output element.

According to the above structure, operating elements for the first compound planetary gearset 2 in the lever analogies of FIGS. 1–4 are as follows: the first operating element A indicates the sun gear 20 of the first simple planetary gearset 16, the second operating element B indicates the planet carriers 28 and 30 of the first and second simple planetary gearsets 16 and 18, the third operating element C indicates the ring gear 26 of the second simple planetary gearset 18, and the fourth operating element D indicates the ring gear 22 and sun gear 24 of the first and second simple planetary gearsets 16 and 18.

Further, the operating elements for the second compound planetary gearset 4 in the lever analogies of FIGS. 1–4 are as follows: the first operating element G indicates the sun gear 44 of the third simple planetary gearset 32, the second operating element H indicates the planet carrier 36 and ring gear 40 of the third and fourth simple planetary gearsets 32 and 34, the third operating element I indicates the planet carrier 46 of the fourth simple planetary gearset 34, and the fourth operating element J indicates the ring gear 38 and sun gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the eleventh embodiment, only the structure of the first and second compound planetary gearsets 2 and 4 is changed from the first embodiment. As the operation of the operating elements in each shift range is identical to that of the first embodiment, an explanation thereof will be omitted herein.

Twelfth Embodiment

Figure 17:
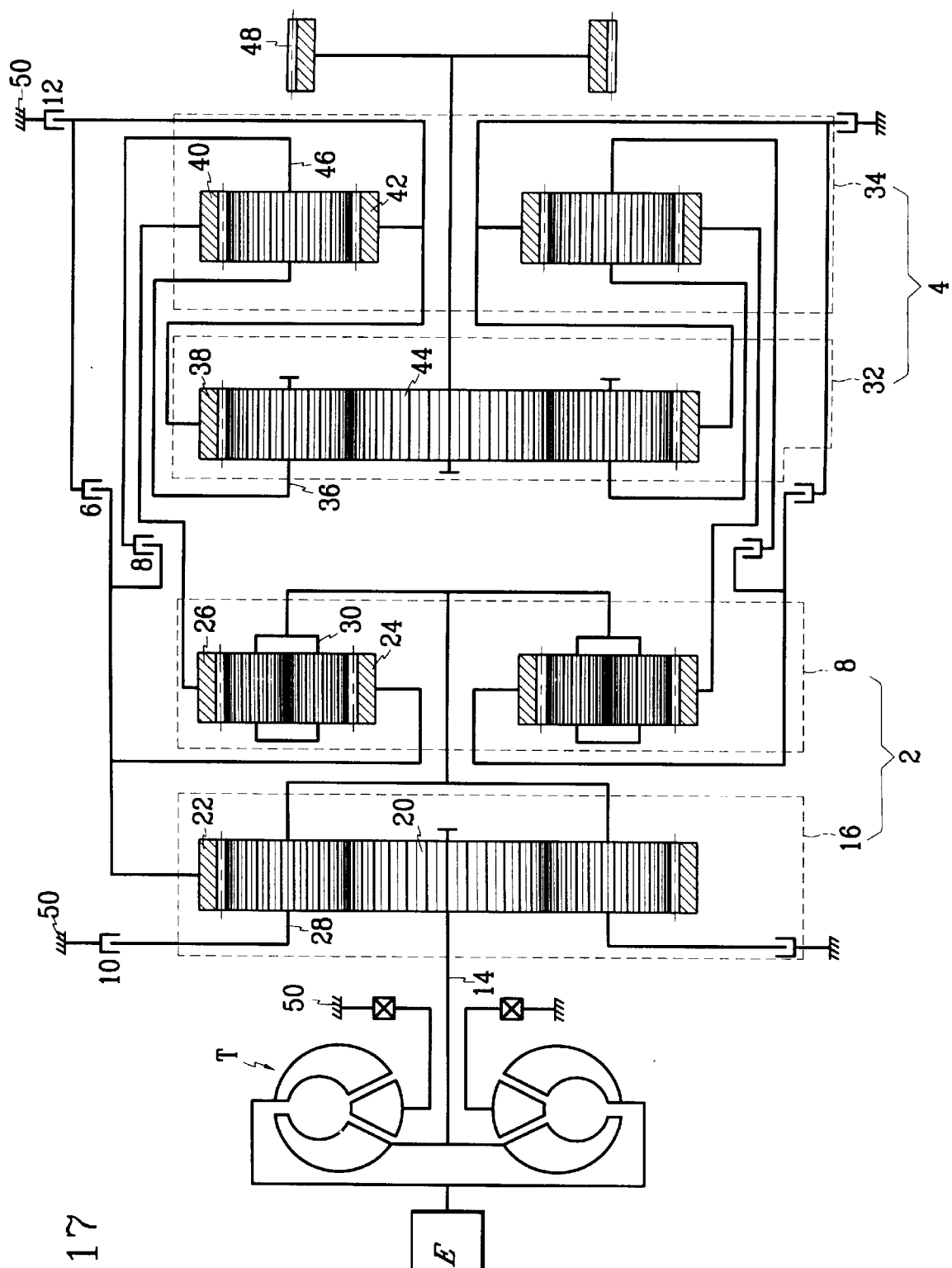
FIG. 17 is a schematic view of a powertrain according to a twelfth preferred embodiment of the present invention.

Referring to FIG. 17, shown is a schematic view of a powertrain according to a twelfth preferred embodiment of the present invention. As shown in the drawing, the planet carrier 36 and ring gear 38 of the third simple planetary gearset 32 are fixedly connected respectively to the planet carrier 46 and sun gear 42 of the fourth simple planetary gearset 34.

Further, with regard to the combination of the first and second compound planetary gearsets 2 and 4, the ring gear 40 of the fourth simple planetary gearset 34 is fixedly connected to the ring gear 26 of the second simple planetary gearset 18, both the ring gear 38 and sun gear 42 of the third and fourth simple planetary gearsets 32 and 34 are variably connected to both the ring gear 22 and sun gear 24 of the first and second simple planetary gearset 16 and 18 through the first clutch 6, and both the planet carriers 36 and 46 of the third and fourth simple planetary gearsets 32 and 34 are variably connected to both the ring gear 22 and sun gear 24 of the first and second planetary gearsets 16 and 18 through the second clutch 8.

Also, the second brake 12 is interposed between a combination of the ring gear 38 and sun gear 42 of the third and fourth simple planetary gearsets 32 and 34 and the transmission housing 50 such that the combination of the ring gear 38 and sun gear 42 selectively acts as a reacting element. Further, the sun gear 44 of the third simple planetary gearset 32 acts as an output element.

According to the above structure, operating elements for the second compound planetary gearset 4 in the lever analogies of FIGS. 1–4 are as follows: the first operating element G indicates the sun gear 44 of the third simple planetary gearset 32, the second operating element H indicates the ring gear 40 of the fourth simple planetary gearset 34, the third operating element I indicates the planet carriers 36 and 46 of the third and fourth simple planetary gearsets 32 and 34, and the fourth operating element J indicates the ring gear 38 and sun gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the twelfth embodiment, only the structure of the second compound planetary gearset 4 is changed from the first embodiment. As the operation of the operating elements in each shift range is identical to that of the first embodiment, an explanation thereof will be omitted.

Thirteenth Embodiment

Figure 18:
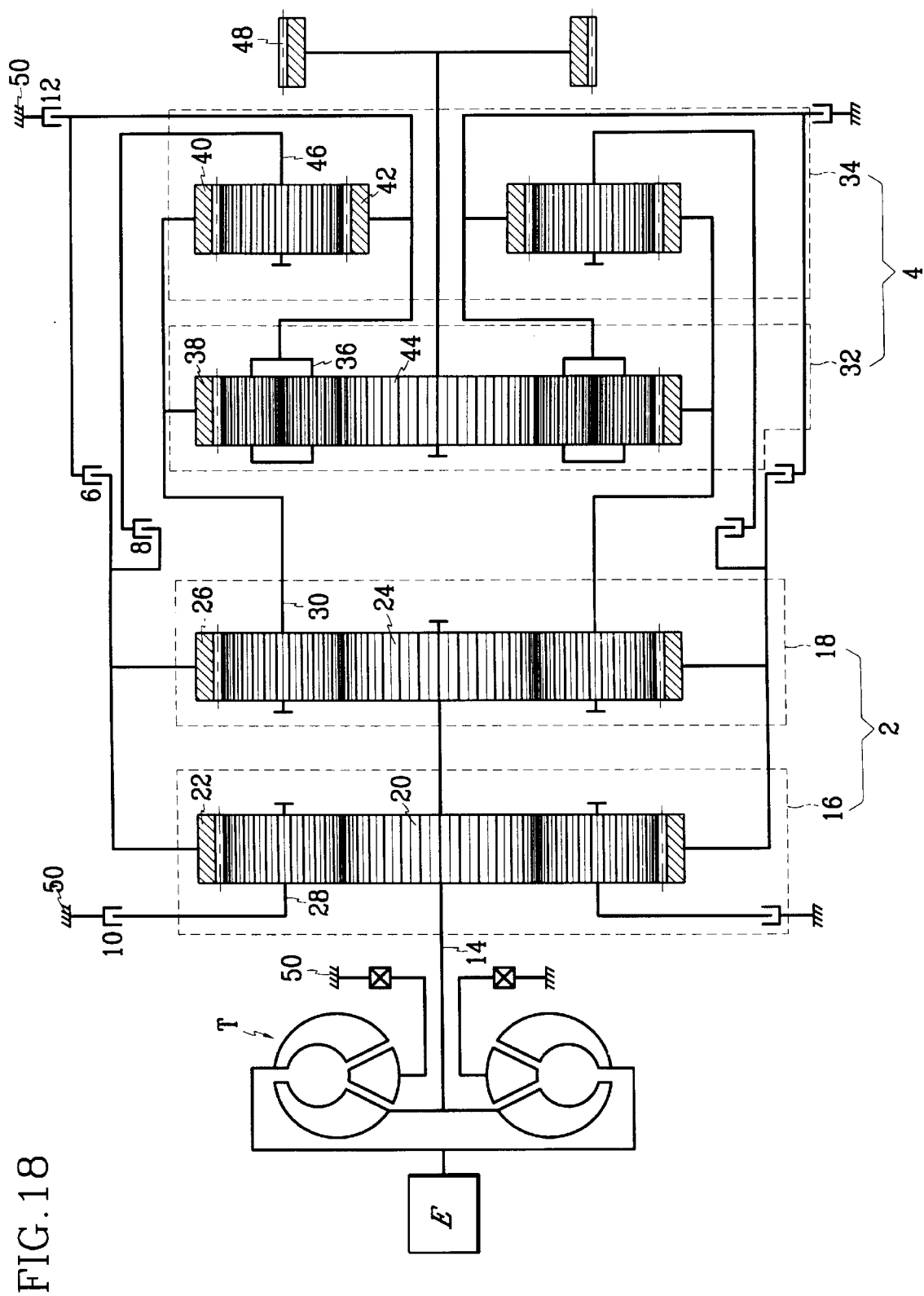
FIG. 18 is a schematic view of a powertrain according to a thirteenth preferred embodiment of the present invention.

Referring to FIG. 18, shown is a schematic view of a powertrain according to an thirteenth preferred embodiment of the present invention. In the drawing, the first compound planetary gearset 2 is formed by combining the first and second simple planetary gearsets 16 and 18, both of which are single pinion planetary gearsets as in the first embodiment. Namely, the sun gear 20 and ring gear 22 of the first simple planetary gearset 16 are fixedly connected respectively to the sun gear 24 and ring gear 26 of the second simple planetary gearset 18.

The second compound planetary gearset 4 is formed by combining the third simple planetary gearset 32, which is a double pinion planetary gearsets in this embodiment, with the fourth simple planetary gearset 34, which is a single pinion planetary gearset as in the first embodiment. The planet carrier 36 and ring gear 38 of the third simple planetary gearset 32 are fixedly connected respectively to the sun gear 42 and ring gear 40 of the fourth simple planetary gearset 34.

Further, with regard to the combination of the first and second compound planetary gearsets 2 and 4, the planet carrier 30 of the second simple planetary gearsets 18 is fixedly connected to the ring gears 38 and 40 of the third and fourth simple planetary gearsets 32 and 34, and both the ring gears 22 and 26 of the first and second simple planetary gearsets 16 and 18 are variably connected to both the planet carrier 36 and sun gear 42 of the third and fourth simple planetary gearsets 32 and 34 through the first clutch 6, and to the planet carrier 46 of the fourth simple planetary gearset 34 through the second clutch 8.

Also, a combination of the planet carrier 28 of the first simple planetary gearset 16 is connected to the transmission housing 50 with the first brake 10 interposed therebetween such that the combination selectively acts as a reacting element, and a combination of the planet carrier 36 and sun gear 42 of the third and fourth simple planetary gearsets 32 and 34 are connected to the transmission housing 50 with the second brake 12 interposed therebetween such that the combination selectively acts as a reacting element. Further, the sun gear 44 of the third simple planetary gearset 32 acts as an output element.

According to the above structure, operating elements for the first compound planetary gearset 2 in the lever analogies of FIGS. 1–4 are as follows: the first operating element A indicates the sun gears 20 and 24 of the first and second simple planetary gearsets 16 and 18, the second operating element B indicates the planet carrier 28 of the first simple planetary gearsets 16, the third operating element C indicates the planet carrier 30 of the second simple planetary gearset 18, and the fourth operating element D indicates the ring gears 22 and 26 of the first and second simple planetary gearsets 16 and 18.

Further, the operating elements for the second compound planetary gearset 4 in the lever analogies of FIGS. 1–4 are as follows: the first operating element G indicates the sun gear 44 of the third simple planetary gearset 32, the second operating element H indicates the ring gears 38 and 40 of the third and fourth simple planetary gearsets 32 and 34, the third operating element I indicates the planet carrier 46 of the fourth simple planetary gearset 34, and the fourth operating element J indicates the planet carrier 36 and sun gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the thirteenth embodiment, only the structure of the first and second compound planetary gearsets 2 and 4 is changed from the first embodiment. As the operation of the operating elements in each shift range is identical to that of the first embodiment, an explanation thereof will be omitted herein.

Fourteenth Embodiment

Figure 19:
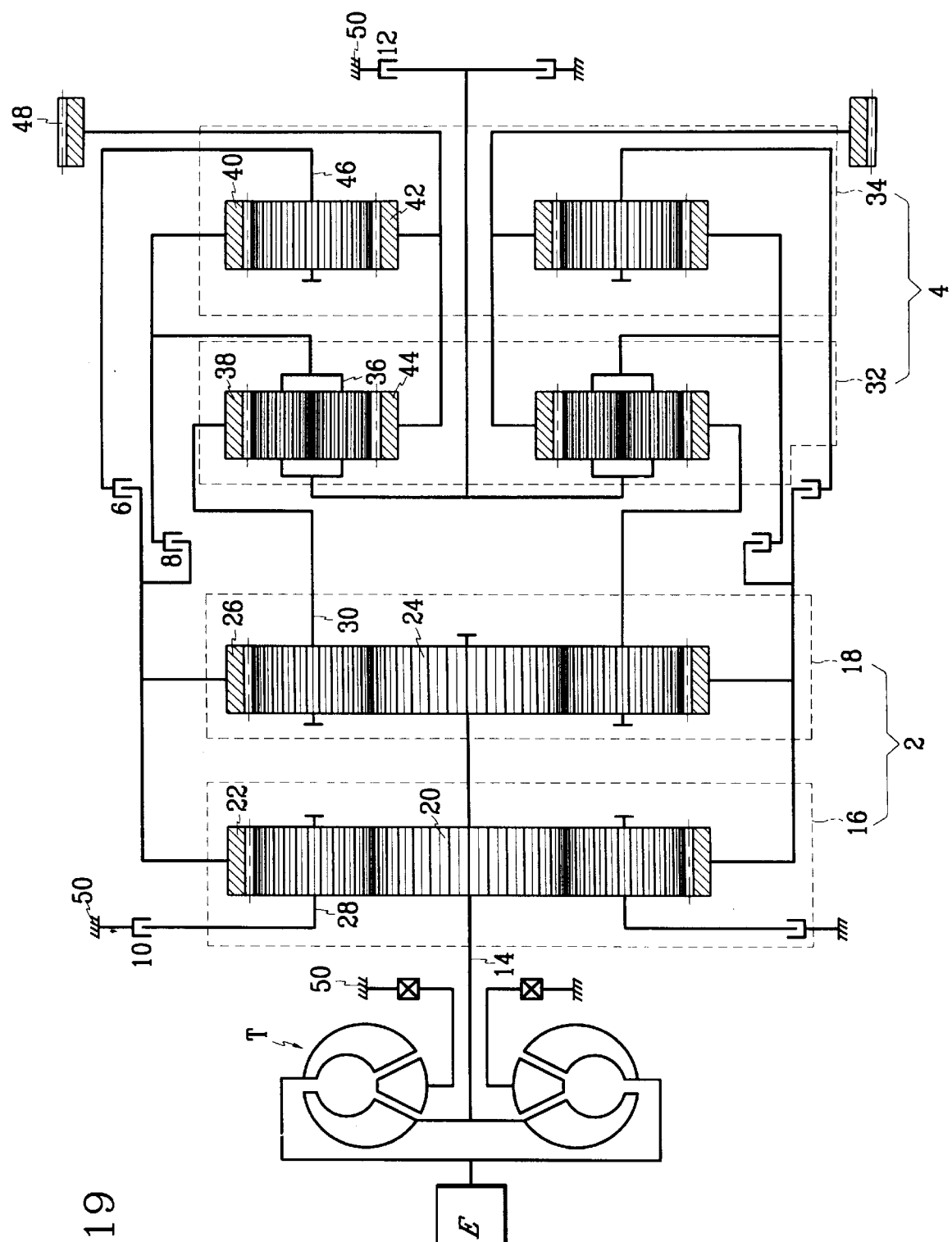
FIG. 19 is a schematic view of a powertrain according to a fourteenth preferred embodiment of the present invention.

Referring to FIG. 19, shown is a schematic view of a powertrain according to a fourteenth preferred embodiment of the present invention. As shown in the drawing, the sun gear 44 and planet carrier 36 of the third simple planetary gearset 32 are fixedly connected respectively to the sun gear 42 and ring gear 40 of the fourth simple planetary gearset 34.

Further, with regard to the combination of the first and second compound planetary gearsets 2 and 4, the ring gear 38 of the third simple planetary gearset 32 is fixedly connected to the planet carrier 30 of the second simple planetary gearset 18, both the planet carrier 36 and ring gear 40 of the third and fourth simple planetary gearsets 32 and 34 are variably connected to both the ring gears 22 and 26 of the first and second simple planetary gearsets 16 and 18 through the second clutch 8, and the planet carrier 46 of the fourth simple planetary gearset 34 is variably connected to both the ring gears 22 and 26 of the first and second simple planetary gearset 16 and 18 through the first clutch 6.

Also, a combination of the planet carrier 36 and ring gear 40 of the third and fourth simple planetary gearsets 32 and 34 is connected to the transmission housing 50 with the second brake 12 interposed therebetween such that the combination selectively acts as a reacting element. In addition, the sun gears 44 and 42 of the third and fourth simple planetary gearsets 32 and 34 act as output elements.

According to the above structure, operating elements for the second compound planetary gearset 4 in the lever analogies of FIGS. 1–4 are as follows: the first operating element G indicates the sun gears 44 and 42 of the third and fourth simple planetary gearsets 32 and 34, the second operating element H indicates the ring gear 38 of the third simple planetary gearset 32, the third operating element I indicates the planet carrier 46 of the fourth simple planetary gearset 34, and the fourth operating element J indicates the planet carrier 36 and ring gear 40 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the fourteenth embodiment, only the structure of the second compound planetary gearset 4 is changed from the first embodiment. As the operation of the operating elements in each shift range is identical to that of the first embodiment, an explanation thereof will be omitted.

Fifteenth Embodiment

Figure 20:
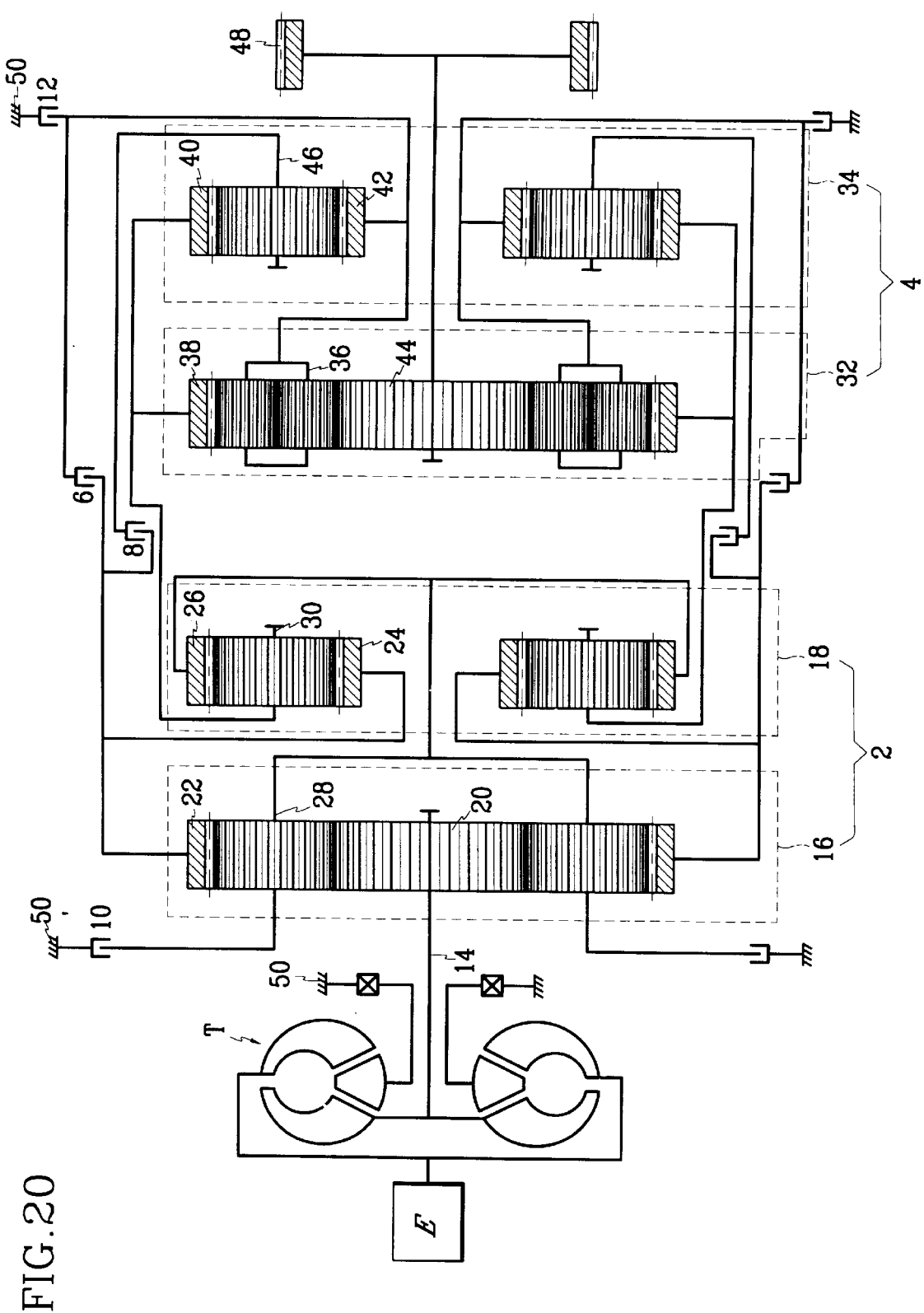
FIG. 20 is a schematic view of a powertrain according to a fifteenth preferred embodiment of the present invention.

Referring to FIG. 20, shown is a schematic view of a powertrain according to a fifteenth preferred embodiment of the present invention. As shown in the drawing, the planet carrier 28 and ring gear 22 of the first simple planetary gearset 16 are fixedly connected respectively to the ring gear 26 and sun gear 24 of the second simple planetary gearset 18.

Further, with regard to the combination of the first and second compound planetary gearsets 2 and 4, the planet carrier 30 of the second simple planetary gearset 18 is fixedly connected to the ring gears 38 and 40 of the third and fourth simple planetary gearsets 32 and 34, and both the ring gear 22 and sun gear 24 of the first and second simple planetary gearsets 16 and 18 are variably connected to both the planet carrier 36 and sun gear 42 of the third and fourth simple planetary gearsets 32 and 34 through the first clutch 6, and to the planet carrier 46 of the fourth simple planetary gearset 34 through the second clutch 8.

Also, a combination of the planet carrier 28 and ring gear 26 of the first and second simple planetary gearsets 16 and 18 is connected to the transmission housing 50 with the first brake 10 interposed therebetween such that the combination selectively acts as a reacting element. In addition, the sun gear 20 of the first simple planetary gearset 16 acts as an input element.

According to the above structure, operating elements for the first compound planetary gearset 2 in the lever analogies of FIGS. 1–4 are as follows: the first operating element A indicates the sun gear 20 of the first simple planetary gearset 16, the second operating element B indicates the planet carrier 28 and ring gear 26 of the first and second simple planetary gearsets 16 and 18, the third operating element C indicates the planet carrier 30 of the second simple planetary gearset 18, and the fourth operating element D indicates the ring gear 22 and sun gear 24 of the first and second simple planetary gearsets 16 and 18.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the fifteenth embodiment, only the structure of the first compound planetary gearset 2 is changed from the first embodiment. As the operation of the operating elements in each shift range is identical to that of the first embodiment, an explanation thereof will be omitted herein.

Sixteenth Embodiment

Figure 21:
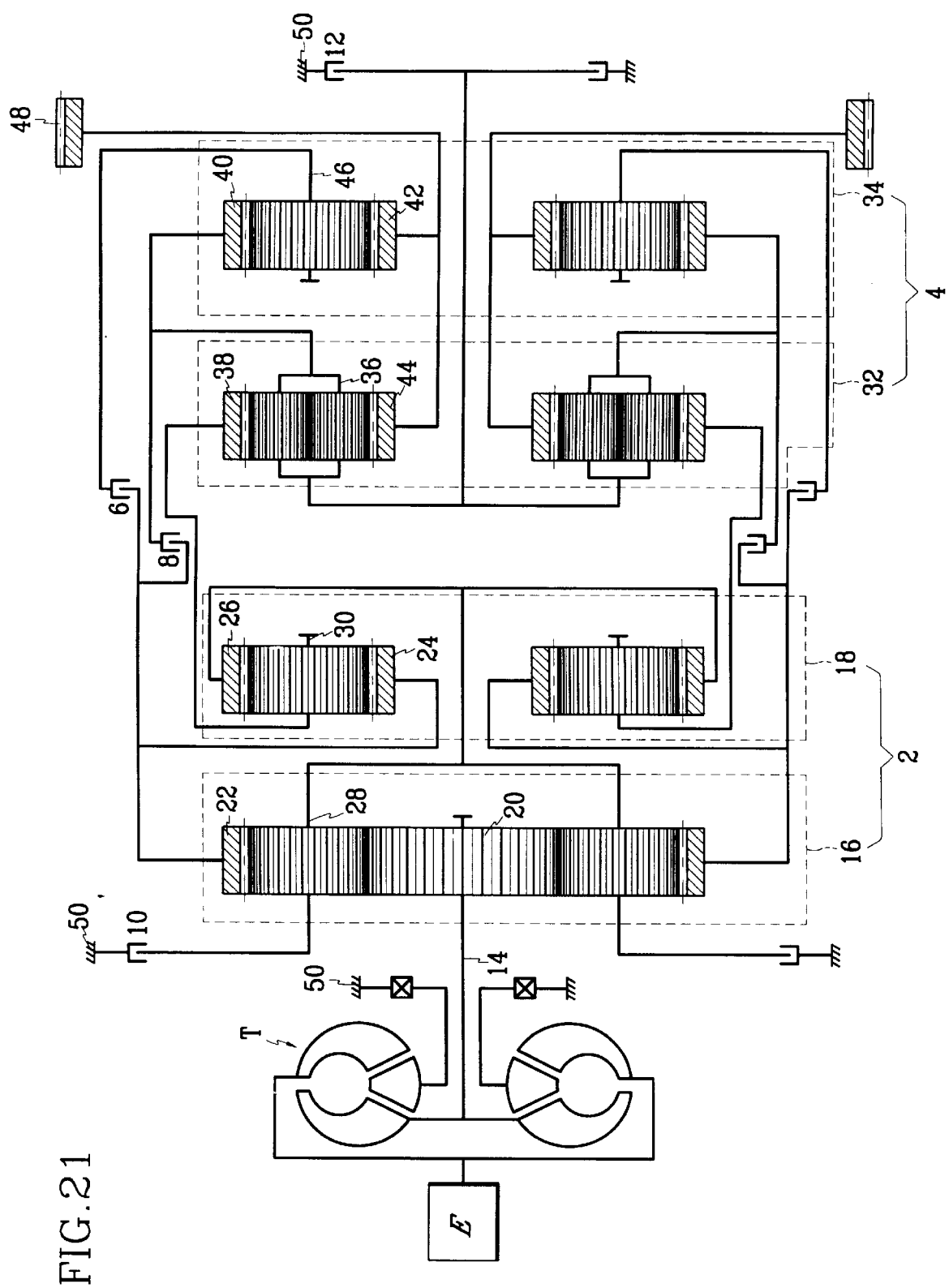
FIG. 21 is a schematic view of a powertrain according to a sixteenth preferred embodiment of the present invention.

Referring to FIG. 21, shown is a schematic view of a powertrain according to a sixteenth preferred embodiment of the present invention. As shown in the drawing, the sun gear 44 an d planet carrier 36 of the third simple planetary gearset 32 are fixedly connected respectively to the sun gear 42 and ring gear 40 of the fourth simple planetary gearset 34.

Further, with regard to the combination of the first and second compound planetary gearsets 2 and 4, the ring gear 38 of the third simple planetary gearset 32 is fixedly connected to the planet carrier 30 of the second simple planetary gearset 18, both the planet carrier 36 and ring gear 40 of the third and fourth simple planetary gearsets 32 and 34 are variably connected to both the ring gear 22 and sun gear 24 of the first and second simple planetary gearsets 16 and 18 through the second clutch 8, and the planet carrier 46 of the fourth simple planetary gearset 34 is variably connected to both the ring gear 22 and sun gear 24 of the first and second simple planetary gearset 16 and 18 through the first clutch 6.

Also, a combination of the planet carrier 36 and ring gear 40 of the third and fourth simple planetary gearsets 32 and 34 is connected to the transmission housing 50 with the second brake 12 interposed therebetween such that the combination of the planet carrier 36 and ring gear 40 selectively acts as a reacting element. In addition, the sun gears 44 and 42 of the third and fourth simple planetary gearsets 32 and 34 act as output elements.

According to the above structure, operating elements for the second compound planetary gearset 4 in the lever analogies of FIGS. 1–4 are as follows: the first operating element G indicates the sun gears 44 and 42 of the third and fourth simple planetary gearsets 32 and 34, the second operating element H indicates the ring gear 38 of the third simple planetary gearset 32, th e third operating element I indicates the planet carrier 46 of the fourth simple planetary gearset 34, and the fourth operating element J indicates the planet carrier 36 and ring gear 40 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the sixteenth embodiment, only the structure of the second compound planetary gearset 4 is changed from the first embodiment. As the operation of the operating elements in each shift range is identical to that of the first embodiment, an explanation thereof will be omitted.

Seventeenth Embodiment

Figure 22:
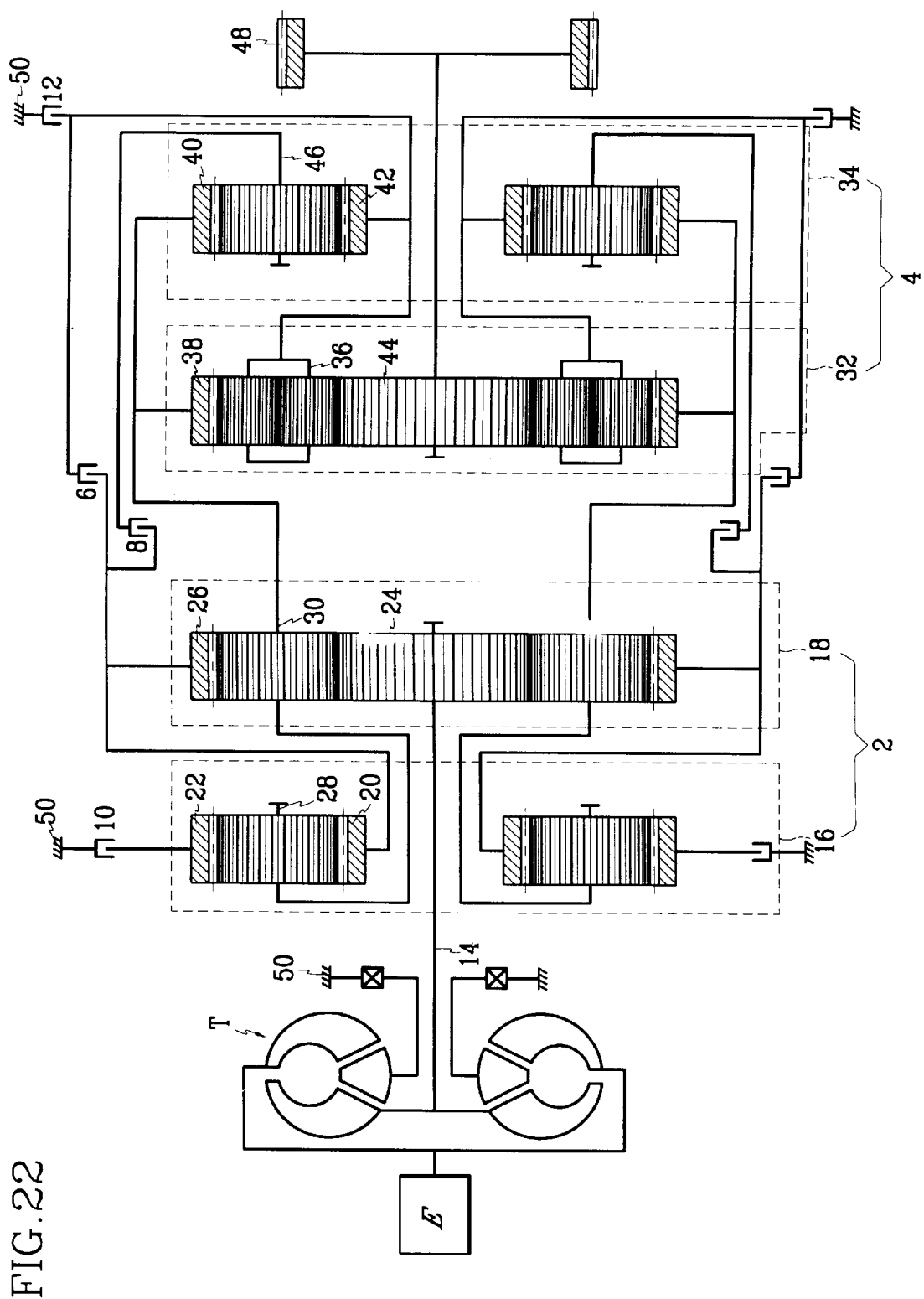
FIG. 22 is a schematic view of a powertrain according to a seventeenth preferred embodiment of the present invention.

Referring to FIG. 22, shown is a schematic view of a powertrain according to a seventeenth preferred embodiment of the present invention. As shown in the drawing, the sun gear 20 and planet carrier 28 of the first simple planetary gearset 16 are fixedly connected respectively to the ring gear 26 and planet carrier 30 of the second simple planetary gearset 18.

Further, with regard to the combination of the first and second compound planetary gearsets 2 and 4, the planet carriers 28 and 30 of the first and second simple planetary gearsets 16 and 18 are fixedly connected to the ring gears 38 and 40 of the third and fourth simple planetary gearsets 32 and 34, and both the sun gear 20 and ring gear 26 of the first and second simple planetary gearsets 16 and 18 are variably connected to both the planet carrier 36 and sun gear 42 of the third and fourth simple planetary gearsets 32 and 34 through the first clutch 6, and to the planet carrier 46 of the fourth simple planetary gearset 34 through the second clutch 8.

Also, the ring gear 22 of the first simple planetary gearset 16 is connected to the transmission housing 50 with the first brake 10 interposed therebetween such that the ring gear 22 selectively acts as a reacting element. Further, the sun gear 24 of the second simple planetary gearset 18 acts as an input element.

According to the above structure, operating elements for the first compound planetary gearset 2 in the lever analogies of FIGS. 1–4 are as follows: the first operating element A indicates the sun gear 24 of the second simple planetary gearset 18, the second operating element B indicates the ring gear 22 of the first simple planetary gearset 16, the third operating element C indicates the planet carriers 28 and 30 of the first and second simple planetary gearsets 16 and 18, and the fourth operating element D indicates the sun gear 20 and ring gear 26 of the first and second simple planetary gearsets 16 and 18.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the seventeenth embodiment, only the structure of the first compound planetary gearset 2 is changed from the first embodiment. As the operation of the operating elements in each shift range is identical to that of the first embodiment, an explanation thereof will be omitted herein.

Eighteenth Embodiment

Figure 23:
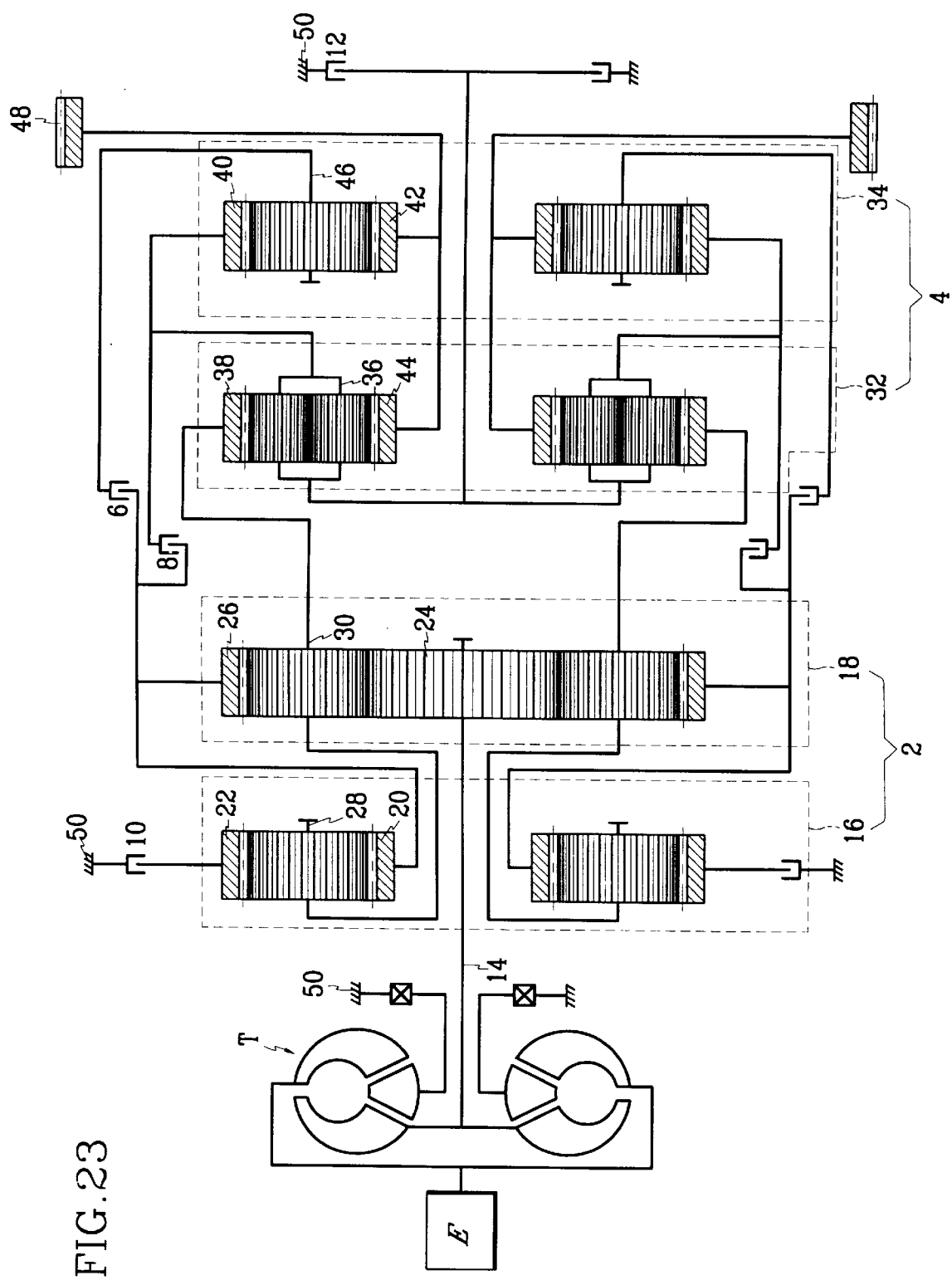
FIG. 23 is a schematic view of a powertrain according to an eighteenth preferred embodiment of the present invention.

Referring to FIG. 23, shown is a schematic view of a powertrain according to an eighteenth preferred embodiment of the present invention. As shown in the drawing, the sun gear 44 and planet carrier 36 of the third simple planetary gearset 32 are fixedly connected respectively to the sun gear 42 and ring gear 40 of the fourth simple planetary gearset 34.

Further, with regard to the combination of the first and second compound planetary gearsets 2 and 4, the ring gear 38 of the third simple planetary gearset 32 is fixedly connected to the planet carriers 28 and 30 of the first and second simple planetary gearsets 16 and 18, both the planet carrier 36 and ring gear 40 of the third and fourth simple planetary gearsets 32 and 34 are variably connected to both the sun gear 20 and ring gear 26 of the first and second simple planetary gearsets 16 and 18 through the second clutch 8, and the planet carrier 46 of the fourth simple planetary gearset 34 is variably connected to both the sun gear 20 and ring gear 26 of the first and second simple planetary gearset 16 and 18 through the first clutch 6.

Also, a combination of the planet carrier 36 and ring gear 40 of the third and fourth simple planetary gearsets 32 and 34 is connected to the transmission housing 50 with the second brake 12 interposed therebetween such that the combination of the planet carrier 36 and ring gear 40 selectively acts as a reacting element. In addition, the sun gears 44 and 42 of the third and fourth simple planetary gearsets 32 and 34 act as output elements.

According to the above structure, operating elements for the second compound planetary gearset 4 in the lever analogies of FIGS. 1–4 are as follows: the first operating element G indicates the sun gears 44 and 42 of the third and fourth simple planetary gearsets 32 and 34, the second operating element H indicates the ring gear 38 of the third simple planetary gearset 32, the third operating element I indicates the planet carrier 46 of the fourth simple planetary gearset 34, and the fourth operating element J indicates the planet carrier 36 and ring gear 40 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the eighteenth embodiment, only the structure of the second compound planetary gearset 4 is changed from the first embodiment. As the operation of the operating elements in each shift range is identical to that of the first embodiment, an explanation thereof will be omitted.

Nineteenth Embodiment

Figure 24:
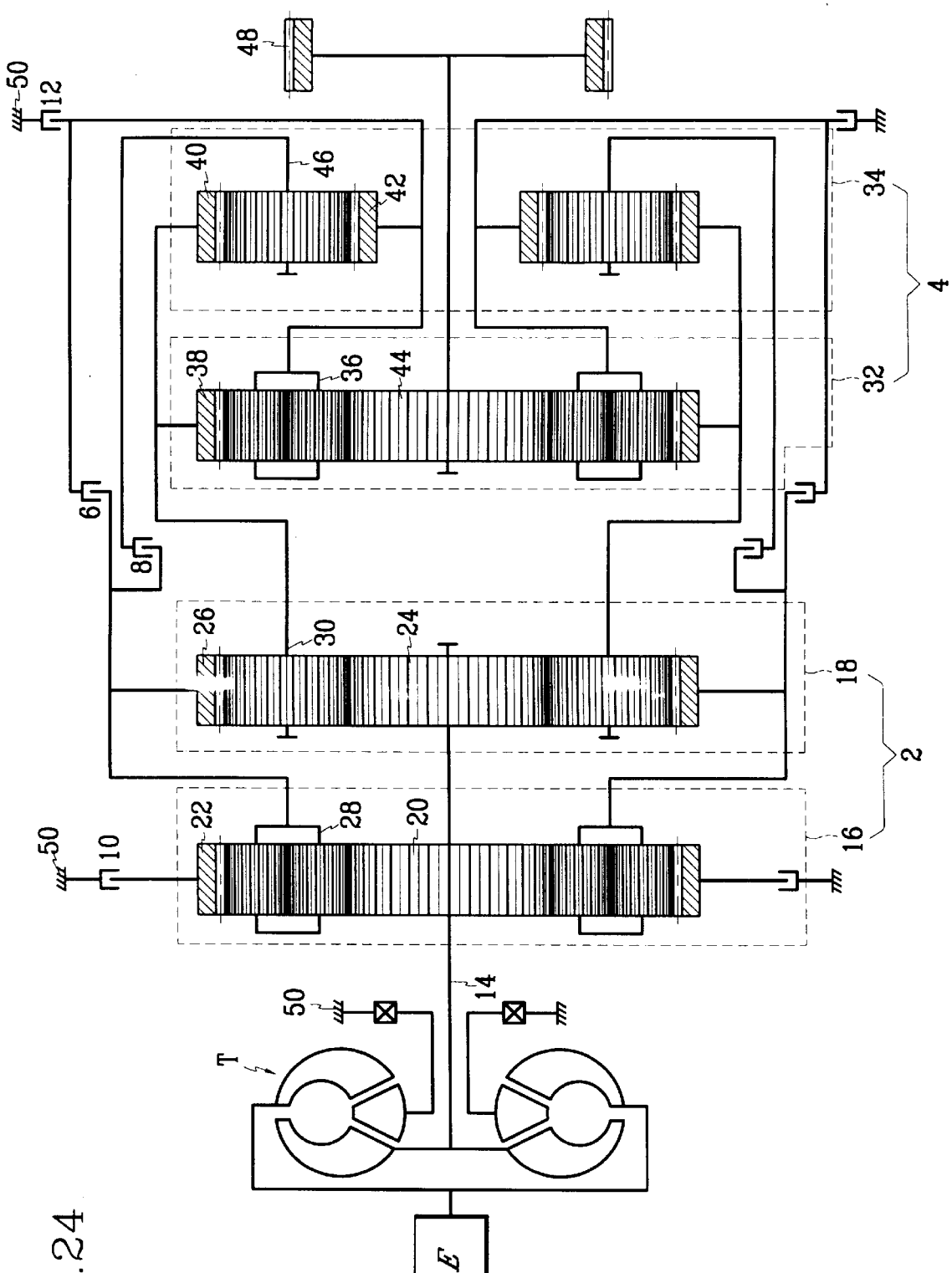
FIG. 24 is a schematic view of a powertrain according to a nineteenth preferred embodiment of the present invention.

Referring to FIG. 24, shown is a schematic view of a powertrain according to a nineteenth preferred embodiment of the present invention. In the drawing, the first compound planetary gearset 2 is formed by combining the first simple planetary gearset 16, which is a double pinion planetary gearset in this embodiment, with the second simple planetary gearset 18, which is a single pinion planetary gearset as in the first embodiment. The sun gear 20 and planet carrier 28 of the first simple planetary gearset 16 are fixedly connected respectively to the sun gear 24 and ring gear 26 of the second simple planetary gearset 18.

The second compound planetary gearset 4 is formed by the combination of the third simple planetary gearset 32, which is a double pinion planetary gearset in this embodiment, with the fourth simple planetary gearset 34, which is a single pinion planetary gearset as in the first embodiment. Namely, the planet carrier 36 and ring gear 38 of the third simple planetary gearset 32 are fixedly connected respectively to the sun gear 42 and ring gear 40 of the fourth simple planetary gearset 34.

Further, with regard to the combination of the first and second compound planetary gearsets 2 and 4, the planet carrier 30 of the second simple planetary gearset 18 is fixedly connected to the ring gears 38 and 40 of the third and fourth simple planetary gearsets 32 and 34, and both the planet carrier 28 and ring gear 26 of the first and second simple planetary gearsets 16 and 18 are variably connected to both the planet carrier 36 and sun gear 42 of the third and fourth simple planetary gearsets 32 and 34 through the first clutch 6, and to the planet carrier 46 of the fourth simple planetary gearset 34 through the second clutch 8.

Also, the ring gear 22 of the first simple planetary gearset 16 is connected to the transmission housing 50 with the first brake 10 interposed therebetween such that the ring gear 22 selectively acts as a reacting element, and a combination of the planet carrier 36 and sun gear 42 of the third and fourth simple planetary gearsets 32 and 34 is connected to the transmission housing 50 with the second brake 12 interposed therebetween such that the combination selectively acts as a reacting element. In addition, the sun gear 44 of the third simple planetary gearset 32 acts as an output element.

According to the above structure, operating elements for the first compound planetary gearset 2 in the lever analogies of FIGS. 1–4 are as follows: the first operating element A indicates the sun gears 20 and 24 of the first and second simple planetary gearsets 16 and 18, the second operating element B indicates the ring gear 22 of the first simple planetary gearset 16, the third operating element C indicates the planet carrier 30 of the second simple planetary gearset 18, and the fourth operating element D indicates the planet carrier 28 and ring gear 26 of the first and second simple planetary gearsets 16 and 18.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the nineteenth embodiment, only the structure of the first and second compound planetary gearsets 2 and 4 is changed from the first embodiment. As the operation of the operating elements in each shift range is identical to that of the first embodiment, an explanation thereof will be omitted herein.

Twentieth Embodiment

Figure 25:
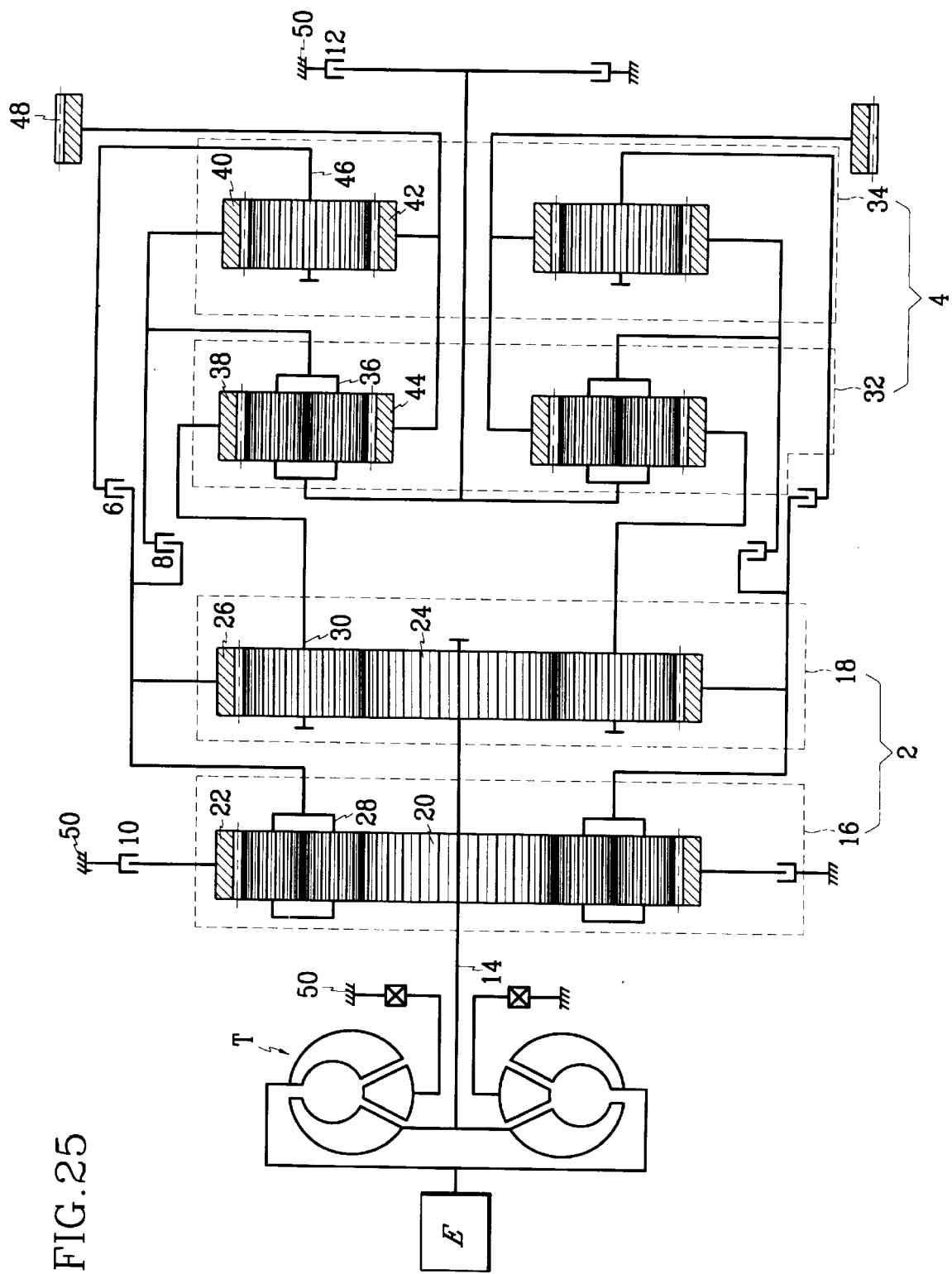
FIG. 25 is a schematic view of a powertrain according to a twentieth preferred embodiment of the present invention.

Referring to FIG. 25, shown is a schematic view of a powertrain according to a twentieth preferred embodiment of the present invention. As shown in the drawing, the sun gear 44 and planet carrier 36 of the third simple planetary gearset 32 are fixedly connected respectively to the sun gear 42 and ring gear 40 of the fourth simple planetary gearset 34.

Further, with regard to the combination of the first and second compound planetary gearsets 2 and 4, the ring gear 38 of the third simple planetary gearset 32 is fixedly connected to the planet carrier 30 of the second simple planetary gearset 18, both the planet carrier 36 and ring gear 40 of the third and fourth simple planetary gearsets 32 and 34 are variably connected to both the planet carrier 28 and ring gear 26 of the first and second simple planetary gearsets 16 and 18 through the second clutch 8, and the planet carrier 46 of the fourth simple planetary gearset 34 is variably connected to both the planet carrier 28 and ring gear 26 of the first and second simple planetary gearset 16 and 18 through the first clutch 6.

Also, a combination of the planet carrier 36 and ring gear 40 of the third and fourth simple planetary gearsets 32 and 34 is connected to the transmission housing 50 with the second brake 12 interposed therebetween such that the combination of the planet carrier 36 and ring gear 40 selectively acts as a reacting element. In addition, the sun gears 44 and 42 of the third and fourth simple planetary gearsets 32 and 34 act as output elements.

According to the above structure, operating elements for the second compound planetary gearset 4 in the lever analogies of FIGS. 1–4 are as follows: the first operating element G indicates the sun gears 44 and 42 of the third and fourth simple planetary gearsets 32 and 34, the second operating element H indicates the ring gear 38 of the third simple planetary gearset 32, the third operating element I indicates the planet carrier 46 of the fourth simple planetary gearset 34, and the fourth operating element J indicates the planet carrier 36 and ring gear 40 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the twentieth embodiment, only the structure of the second compound planetary gearset 4 is changed from the first embodiment. As the operation of the operating elements in each shift range is identical to that of the first embodiment, an explanation thereof will be omitted.

Twenty-first Embodiment

Figure 26:
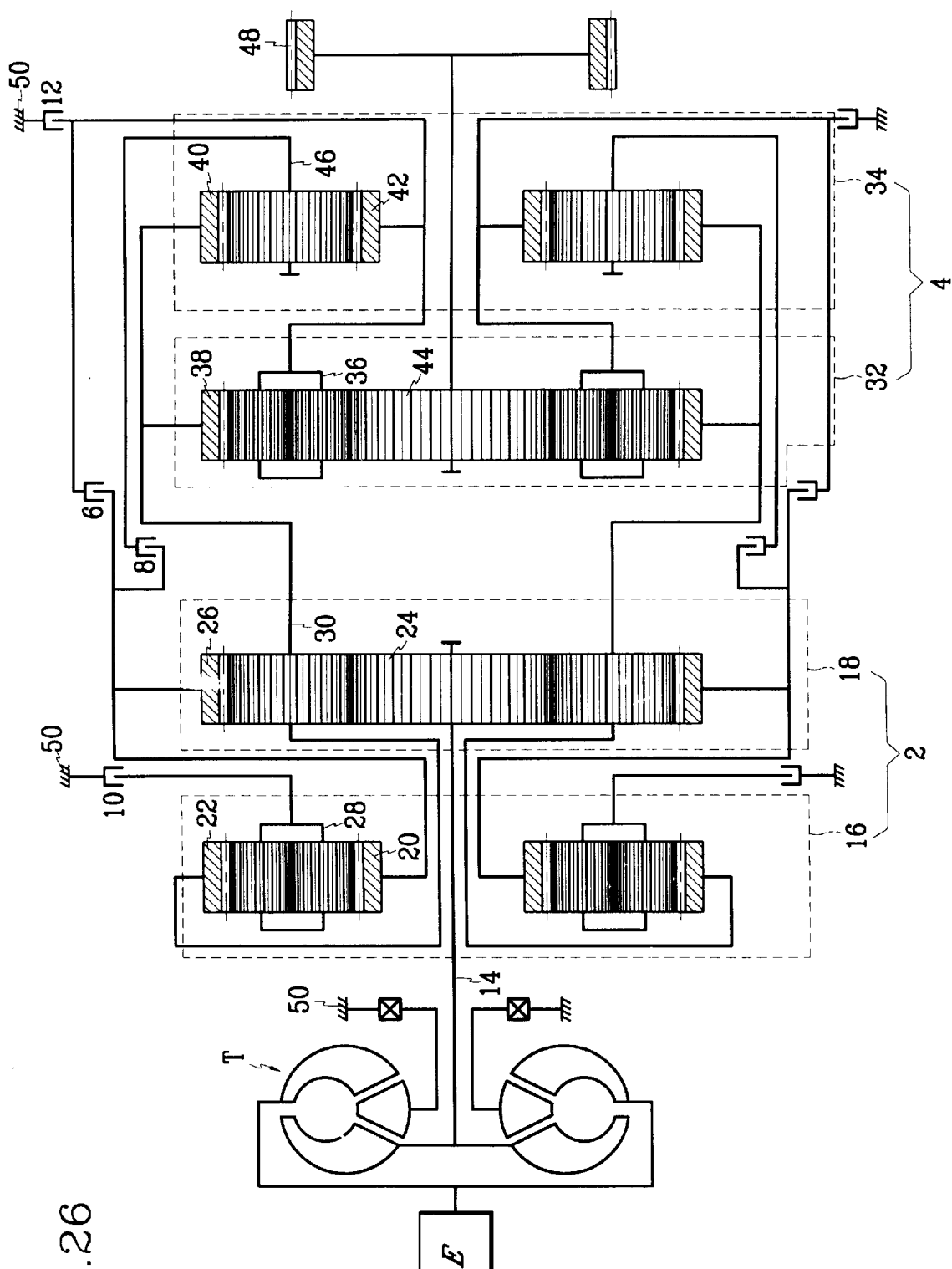
FIG. 26 is a schematic view of a powertrain according to a twenty-first preferred embodiment of the present invention.

Referring to FIG. 26, shown is a schematic view of a powertrain according to a twenty-first preferred embodiment of the present invention. As shown in the drawing, the sun gear 20 and ring gear 22 of the first simple planetary gearset 16 are fixedly connected respectively to the ring gear 26 and planet carrier 30 of the second simple planetary gearset 18.

Further, with regard to the combination of the first and second compound planetary gearsets 2 and 4, the ring gear 22 and planet carrier 30 of the first and second simple planetary gearsets 16 and 18 are fixedly connected to the ring gears 38 and 40 of the third and fourth simple planetary gearsets 32 and 34, and both the sun gear 20 and ring gear 26 of the first and second simple planetary gearsets 16 and 18 are variably connected to both the planet carrier 36 and sun gear 42 of the third and fourth simple planetary gearsets 32 and 34 through the first clutch 6, and to the planet carrier 46 of the fourth simple planetary gearset 34 through the second clutch 8.

Also, the planet carrier 28 of the first simple planetary gearset 16 is connected to the transmission housing 50 with the first brake 10 interposed therebetween such that the planet carrier 28 selectively acts as a reacting element. Further, the sun gear 24 of the second simple planetary gearset 18 acts as an input element.

According to the above structure, operating elements for the first compound planetary gearset 2 in the lever analogies of FIGS. 1–4 are as follows: the first operating element A indicates the sun gear 24 of the second simple planetary gearset 18, the second operating element B indicates the planet carrier 28 of the first simple planetary gearset 16, the third operating element C indicates the ring gear 22 and planet carrier 30 of the first and second simple planetary gearsets 16 and 18, and the fourth operating element D indicates the sun gear 20 and ring gear 26 of the first and second simple planetary gearsets 16 and 18.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the twenty-first embodiment, only the structure of the first compound planetary gearset 2 is changed from the first embodiment. As the operation of the operating elements in each shift range is identical to that of the first embodiment, an explanation thereof will be omitted herein.

Twenty-second Embodiment

Figure 27:
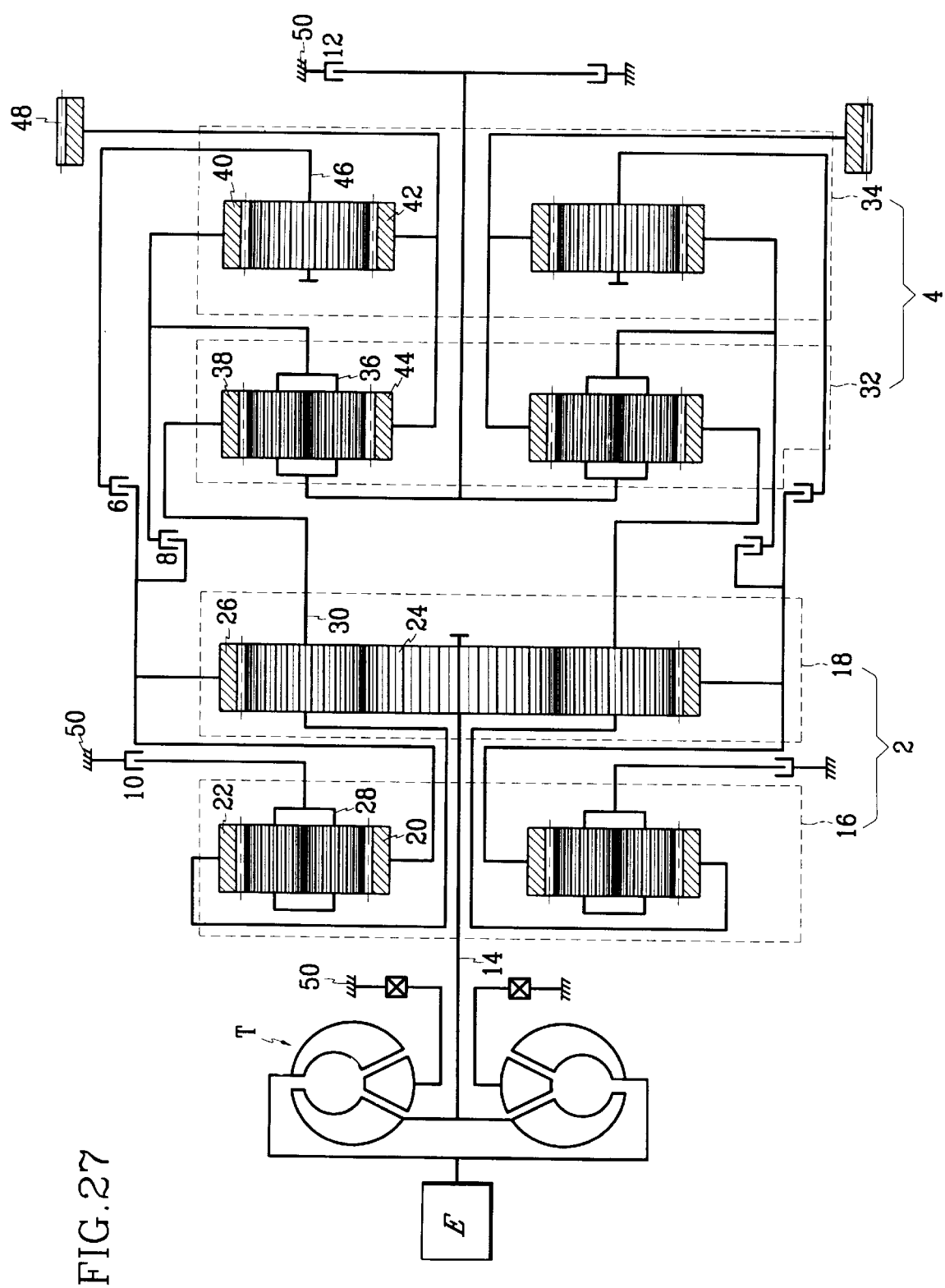
FIG. 27 is a schematic view of a powertrain according to a twenty-second preferred embodiment of the present invention.

Referring to FIG. 27, shown is a schematic view of a powertrain according to a twenty-second preferred embodiment of the present invention. As shown in the drawing, the sun gear 44 and planet carrier 36 of the third simple planetary gearset 32 are fixedly connected respectively to the sun gear 42 and ring gear 40 of the fourth simple planetary gearset 34.

Further, with regard to the combination of the first and second compound planetary gearsets 2 and 4, the ring gear 38 of the third simple planetary gearset 32 is fixedly connected to the ring gear 22 and planet carrier 30 of the first and second simple planetary gearsets 16 and 18, both the planet carrier 36 and ring gear 40 of the third and fourth simple planetary gearsets 32 and 34 are variably connected to both the sun gear 20 and ring gear 26 of the first and second simple planetary gearsets 16 and 18 through the second clutch 8, and the planet carrier 46 of the fourth simple planetary gearset 34 is variably connected to both the sun gear 20 and ring gear 26 of the first and second simple planetary gearset 16 and 18 through the first clutch 6.

Also, a combination of the planet carrier 36 and ring gear 40 of the third and fourth simple planetary gearsets 32 and 34 is connected to the transmission housing 50 with the second brake 12 interposed therebetween such that the combination of the planet carrier 36 and ring gear 40 selectively acts as a reacting element. In addition, the sun gears 44 and 42 of the third and fourth simple planetary gearsets 32 and 34 act as output elements.

According to the above structure, operating elements for the second compound planetary gearset 4 in the lever analogies of FIGS. 1–4 are as follows: the first operating element G indicates the sun gears 44 and 42 of the third and fourth simple planetary gearsets 32 and 34, the second operating element H indicates the ring gear 38 of the third simple planetary gearset 32, the third operating element I indicates the planet carrier 46 of the fourth simple planetary gearset 34, and the fourth operating element J indicates the planet carrier 36 and ring gear 40 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the twenty-second embodiment, only the structure of the second compound planetary gearset 4 is changed from the first embodiment. As the operation of the operating elements in each shift range is identical to that of the first embodiment, an explanation thereof will be omitted.

Twenty-third Embodiment

Figure 28:
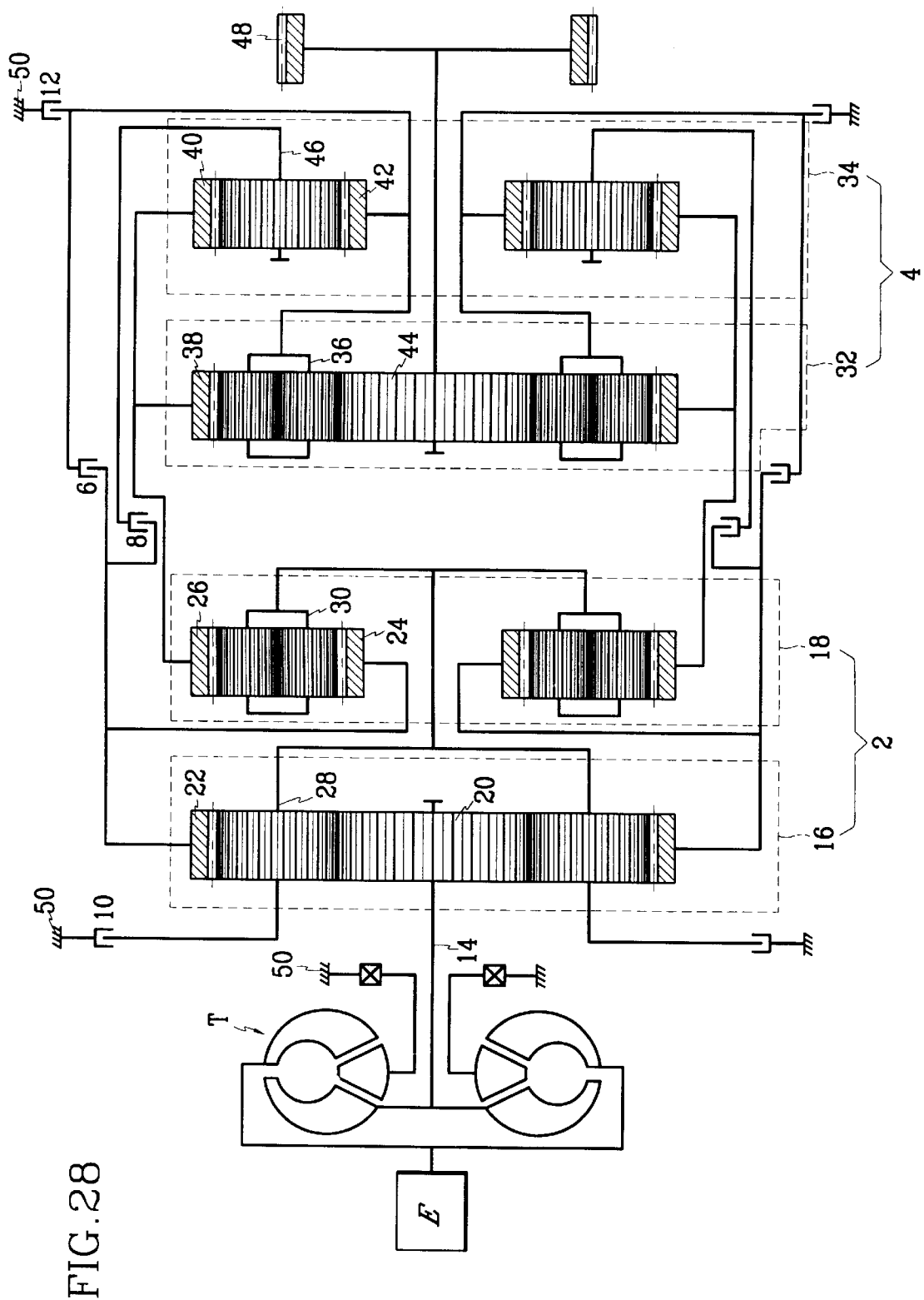
FIG. 28 is a schematic view of a powertrain according to a twenty-third preferred embodiment of the present invention.

Referring to FIG. 28, shown is a schematic view of a powertrain according to a twenty-third preferred embodiment of the present invention. In the drawing, the first compound planetary gearset 2 is formed by combining the first simple planetary gearset 16, which is a single pinion planetary gearset as in the first embodiment, with the second simple planetary gearset 18, which is a double pinion planetary gearset in this embodiment. The planet carrier 28 and ring gear 22 of the first simple planetary gearset 16 are fixedly connected respectively to the planet carrier 30 and sun gear 24 of the second simple planetary gearset 18.

The second compound planetary gearset 4 is formed by the combination of the third simple planetary gearset 32, which is a double pinion planetary gearset in this embodiment, with the fourth simple planetary gearset 34, which is a single pinion planetary gearset as in the first embodiment. Namely, the planet carrier 36 and ring gear 38 of the third simple planetary gearset 32 are fixedly connected respectively to the sun gear 42 and ring gear 40 of the fourth simple planetary gearset 34.

Further, with regard to the combination of the first and second compound planetary gearsets 2 and 4, the ring gear 26 of the second simple planetary gearset 18 is fixedly connected to the ring gears 38 and 40 of the third and fourth simple planetary gearsets 32 and 34, and both the ring gear 22 and sun gear 24 of the first and second simple planetary gearsets 16 and 18 are variably connected to both the planet carrier 36 and sun gear 42 of the third and fourth simple planetary gearsets 32 and 34 through the first clutch 6, and to the planet carrier 46 of the fourth simple planetary gearset 34 through the second clutch 8.

Also, the planet carriers 28 and 30 of the first and second simple planetary gearsets 16 and 18 are connected to the transmission housing 50 with the first brake 10 interposed therebetween such that the planet carriers 28 and 30 selectively act as reacting elements, and a combination of the planet carrier 36 and sun gear 42 of the third and fourth simple planetary gearsets 32 and 34 is connected to the transmission housing 50 with the second brake 12 interposed therebetween such that the combination selectively acts as a reacting element. In addition, the sun gear 44 of the third simple planetary gearset 32 acts as an output element.

According to the above structure, operating elements for the first compound planetary gearset 2 in the lever analogies of FIGS. 1–4 are as follows: the first operating element A indicates the sun gear 20 of the first simple planetary gearset 16, the second operating element B indicates the planet carriers 28 and 30 of the first and second simple planetary gearsets 16 and 18, the third operating element C indicates the ring gear 26 of the second simple planetary gearset 18, and the fourth operating element D indicates the ring gear 22 and sun gear 24 of the first and second simple planetary gearsets 16 and 18.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the twenty-third embodiment, only the structure of the first and second compound planetary gearsets 2 and 4 is changed from the first embodiment. As the operation of the operating elements in each shift range is identical to that of the first embodiment, an explanation thereof will be omitted herein.

Twenty-fourth Embodiment

Figure 29:
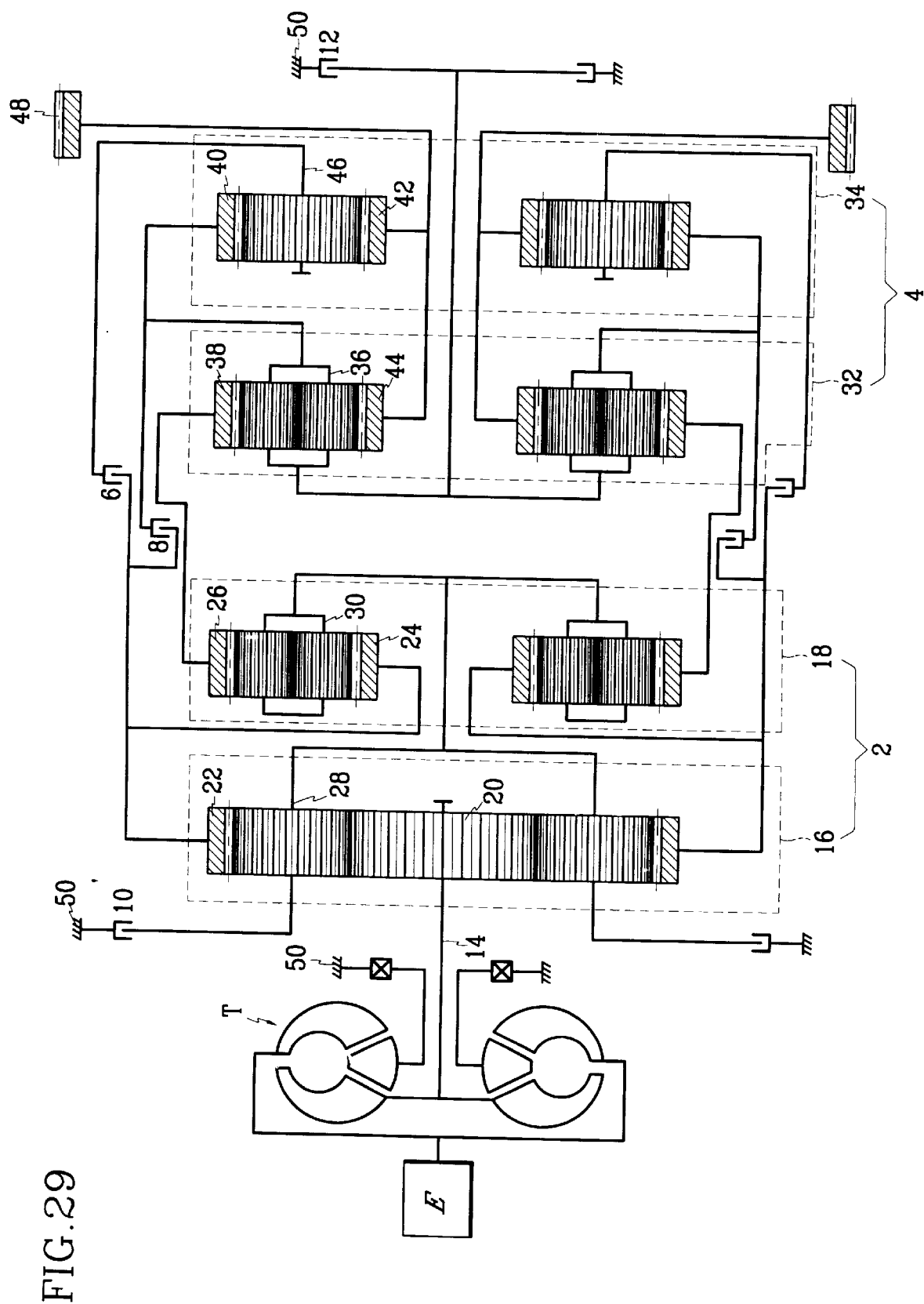
FIG. 29 is a schematic view of a powertrain according to a twenty-fourth preferred embodiment of the present invention.

Referring to FIG. 29, shown is a schematic view of a powertrain according to a twenty-fourth preferred embodiment of the present invention. As shown in the drawing, the sun gear 44 and planet carrier 36 of the third simple planetary gearset 32 are fixedly connected respectively to the sun gear 42 and ring gear 40 of the fourth simple planetary gearset 34.

Further, with regard to the combination of the first and second compound planetary gearsets 2 and 4, the ring gear 38 of the third simple planetary gearset 32 is fixedly connected to the ring gear 26 of the second simple planetary gearset 18, both the planet carrier 36 and ring gear 40 of the third and fourth simple planetary gearsets 32 and 34 are variably connected to both the ring gear 22 and sun gear 24 of the first and second simple planetary gearsets 16 and 18 through the second clutch 8, and the planet carrier 46 of the fourth simple planetary gearset 34 is variably connected to both the ring gear 22 and sun gear 24 of the first and second simple planetary gearset 16 and 18 through the first clutch 6.

Also, a combination of the planet carrier 36 and ring gear 40 of the third and fourth simple planetary gearsets 32 and 34 is connected to the transmission housing 50 with the second brake 12 interposed therebetween such that the combination of the planet carrier 36 and ring gear 40 selectively acts as a reacting element. In addition, the sun gears 44 and 42 of the third and fourth simple planetary gearsets 32 and 34 act as output elements.

According to the above structure, operating elements for the second compound planetary gearset 4 in the lever analogies of FIGS. 1–4 are as follows: the first operating element G indicates the sun gears 44 and 42 of the third and fourth simple planetary gearsets 32 and 34, the second operating element H indicates the ring gear 38 of the third simple planetary gearset 32, the third operating element I indicates the planet carrier 46 of the fourth simple planetary gearset 34, and the fourth operating element J indicates the planet carrier 36 and ring gear 40 of the third and fourth simple planetary gearsets 32 and 34.

The operating elements of the first compound planetary gearset 2 are connected to the operating elements of the second compound planetary gearset 4 identically as in the first embodiment. Namely, the third operating element C of the first compound planetary gearset 2 is fixedly connected to the second operating element H of the second compound planetary gearset 4, and the fourth operating element D of the first compound planetary gearset 2 is variably connected to the fourth and third operating elements J and I of the second compound planetary gearset 2.

Here, input is realized through the first operating element A of the first compound planetary gearset 2, the second operating element B of the first compound planetary gearset 2 and the fourth operating element J of the second compound planetary gearset 4 selectively operate as reacting elements, and output is realized through the first operating element G of the second compound planetary gearset 4.

In the twenty-fourth embodiment, only the structure of the second compound planetary gearset 4 is changed from the first embodiment. As the operation of the operating elements in each shift range is identical to that of the first embodiment, an explanation thereof will be omitted.

In the powertrain for a 5-speed automatic transmission structured and operating as in the above, by eliminating an element rotating faster than a final output element needed in prior art when in overdrive, power loss is minimized. Also, as the number of friction elements is reduced, the powertrain can be designed to be compact in size and lightweight.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A powertrain for a 5-speed automatic transmission comprising:

a first compound planetary gearset comprising first and second simple planetary gearsets having first, second, third, and fourth operating elements, said first operating element acting as an input element;

a second compound planetary gearset comprising third and fourth simple planetary gearsets having fifth, sixth, seventh, and eighth operating elements, said fifth operating element acting as an output element, said sixth operating element being fixedly connected to the third operating element, and said seventh and eighth operating elements being variably connected to the fourth operating element;

clutch means for variably connecting said seventh and eighth operating elements to the fourth operating element; and brake means for selectively connecting at least one of the operating elements of the first and second compound planetary gearsets to a transmission housing.

2. The powertrain of claim 1, wherein said first compound planetary gearset is realized through the combination of the first and second simple planetary gearsets, and said second compound planetary gearset is realized through the combination of the third and fourth simple planetary gearsets, said first, second, third, and fourth simple planetary gearsets being single pinion planetary gearsets.

3. The powertrain of claim 2, wherein a sun gear and a ring gear of the first simple planetary gearset are fixedly connected respectively to a sun gear and a ring gear of the second simple planetary gearset.

4. The powertrain of claim 3, wherein the first operating element is a combination of the sun gears of the first and second simple planetary gearsets;

the second operating element is a planet carrier of the first simple planetary gearset;

the third operating element is a planetary carrier of the second simple planetary gearset; and the fourth operating element is a combination of the ring gears of the first and second simple planetary gearsets.

5. The powertrain of claim 2, wherein a planet carrier and a ring gear of the first simple planetary gearset are fixedly connected respectively to a ring gear and a sun gear of the second simple planetary gearset.

6. The powertrain of claim 5, wherein the first operating element is a sun gear of the first simple planetary gearset;

the second operating element is a combination of the planet carrier and ring gear of the first and second simple planetary gearsets;

the third operating element is a planet carrier of the second simple planetary gearset; and the fourth operating element is a combination of the ring gear and sun gear of the first and second simple planetary gearsets.

7. The powertrain of claim 2, wherein a planet carrier and a sun gear of the first simple planetary gearset are fixedly connected respectively to a planet carrier and a ring gear of the second simple planetary gearset.

8. The powertrain of claim 5, wherein the first operating element is the sun gear of the second simple planetary gearset;

the second operating element is a ring gear of the first simple planetary gearset;

the third operating element is a combination of the planet carrier of the first simple planetary gearset and a planet carrier of the second simple planetary gearset; and the fourth operating element is a combination of a sun gear of the first simple planetary gearset and the ring gear of the second simple planetary gearsets.

9. The powertrain of claim 2, wherein a planet carrier and a ring gear of the third simple planetary gearset are fixedly connected respectively to a ring gear and a sun gear of the fourth simple planetary gearset.

10. The powertrain of claim 9, wherein the fifth operating element is a sun gear of the third simple planetary gearset;

the sixth operating element is a ring gear of the fourth simple planetary gearset;

the seventh operating element is a combination of the planet carrier of the third simple planetary gearset and the ring gear of the fourth simple planetary gearset; and the fourth operating element is a combination of the ring gear and sun gear of the third and fourth simple planetary gearsets.

11. The powertrain of claim 2, wherein a planet carrier and a ring gear of the third simple planetary gearset are fixedly connected respectively to a planet carrier and a sun gear of the fourth simple planetary gearset.

12. The powertrain of claim 11, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

13. The powertrain of claim 1, wherein the first compound planetary gearset is realized by the combination of the first simple planetary gearset, which is a double pinion planetary gearset, with the second simple planetary gearset, which is a single pinion planetary gearset, and the second compound planetary gearset is realized by the combination of the third and fourth simple planetary gearsets, both of which are single pinion planetary gearsets.

14. The powertrain of claim 13, wherein a planet carrier and a sun gear of the first simple planetary gearset are fixedly connected respectively to a ring gear and a sun gear of the second simple planetary gearset.

15. The powertrain of claim 14, wherein the first operating element is a combination of the sun gears of the first and second simple planetary gearsets;

the second operating element is a ring gear of the first simple planetary gearset;

the third operating element is a planetary carrier of the second simple planetary gearset; and the fourth operating element is a combination of the planet carrier and the ring gear of the first and second simple planetary gearsets.

16. The powertrain of claim 13, wherein a sun gear and a ring gear of the first simple planetary gearset are fixedly connected respectively to a ring gear and a planet carrier of the second simple planetary gearset.

17. The powertrain of claim 16, wherein the first operating element is a sun gear of the second simple planetary gearset;

the second operating element is a planet carrier of the first simple planetary gearset;

the third operating element is a combination of the ring gear and planet carrier of the first and second simple planetary gearsets; and the fourth operating element is a combination of the sun gear and ring gear of the first and second simple planetary gearsets.

18. The powertrain of claim 13, wherein a planet carrier and a ring gear of the third simple planetary gearset are fixedly connected respectively to a planet carrier and a sun gear of the fourth simple planetary gearset.

19. The powertrain of claim 18, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

20. The powertrain of claim 13, wherein a planet carrier and a ring gear of the third simple planetary gearset is fixedly connected respectively to a planet carrier and a sun gear of the fourth simple planetary gearset.

21. The powertrain of claim 9, wherein the fifth operating element is a sun gear of the third simple planetary gearset;

the sixth operating element is a ring gear of the fourth simple planetary gearsets;

the seventh operating element is a combination of the planet carriers of the third and fourth simple planetary gearset; and the fourth operating element is a combination of the ring gear and sun gear of the third and fourth simple planetary gearsets.

22. The powertrain of claim 1, wherein the first compound planetary gearset is realized by the combination of the first simple planetary gearset, which is a single pinion planetary gearset, with the second simple planetary gearset, which is a double pinion planetary gearset, and the second compound planetary gearset is realized by the combination of the third and fourth simple planetary gearsets, both of which are single pinion planetary gearsets.

23. The powertrain of claim 22, wherein a planet carrier and a ring gear of the first simple planetary gearset are fixedly connected respectively to a sun gear and a planet carrier of the second simple planetary gearset.

24. The powertrain of claim 23, wherein the first operating element is a sun gear of the first simple planetary gearset;

the second operating element is a combination of the planet carriers of the first and second simple planetary gearsets;

the third operating element is a ring gear of the second simple planetary gearset; and the fourth operating element is a combination of the ring gear and sun gear of the first and second simple planetary gearsets.

25. The powertrain of claim 22, wherein a planet carrier and a ring gear of the third simple planetary gearset are fixedly connected respectively to a planet carrier and sun gear of the fourth simple planetary gearset.

26. The powertrain of claim 25, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

27. The powertrain of claim 22, wherein a planet carrier and a ring gear of the third simple planetary gearset are fixedly connected respectively to a planet carrier and a sun gear of the fourth simple planetary gearset.

28. The powertrain of claim 27, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

29. The powertrain of claim 1, wherein the first compound planetary gearset is realized by the combination of the first and second simple planetary gearsets, both of which are single pinion planetary gearsets, and the second compound planetary gearset is realized by the combination of the third simple planetary gearset, which is a double pinion planetary gearset, with the fourth simple planetary gearset, which is a single pinion planetary gearset.

30. The powertrain of claim 29, wherein a sun gear and a ring gear of the first simple planetary gearset are fixedly connected respectively to a sun gear and a ring gear of the second simple planetary gearset.

31. The powertrain of claim 30, wherein the first operating element is a combination of the sun gears of the first simple planetary gearset;

the second operating element is a planet carrier of the first simple planetary gearset;

the third operating element is a planet carrier of the second simple planetary gearset; and the fourth operating element is a combination of the ring gears of the first and second simple planetary gearsets.

41

32. The powertrain of claim 29, wherein a planet carrier and a ring gear of the first simple planetary gearset are fixedly connected respectively to a ring gear and a sun gear of the second simple planetary gearset.

33. The powertrain of claim 32, wherein the first operating element is a sun gear of the first simple planetary gearset;

the second operating element is a combination of the planet carrier and ring gear of the first and second simple planetary gearsets;

the third operating element is a planet carrier of the second simple planetary gearset; and the fourth operating element is a combination of the ring gear and sun gear of the first and second simple planetary gearsets.

34. The powertrain of claim 29, wherein a sun gear and a planet carrier of the first simple planetary gearset are fixedly connected respectively to a ring gear and a planet carrier of the second simple planetary gearset.

35. The powertrain of claim 34, wherein the first operating element is a sun gear of the second simple planetary gearset;

the second operating element is a ring gear of the first simple planetary gearset;

the third operating element is a combination of the planet carriers of the first and second simple planetary gearsets; and the fourth operating element is a combination of the sun gear and ring gear of the first and second simple planetary gearsets.

36. The powertrain of claim 29, wherein a planet carrier and a ring gear of the third simple planetary gearset are fixedly connected respectively to a planet carrier and a sun gear of the fourth simple planetary gearset.

37. The powertrain of claim 36, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

38. The powertrain of claim 29, wherein a planet carrier and a ring gear of the third simple planetary gearset are fixedly connected respectively to a planet carrier and a sun gear of the fourth simple planetary gearset.

39. The powertrain of claim 38, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

40. The powertrain of claim 1, wherein the first compound planetary gearset is realized by the combination of the first simple planetary gearset, which is a double pinion planetary gearset, with the second simple planetary gearset, which is a single pinion planetary gearset, and the second compound planetary gearset is realized by the combination of the third simple planetary gearset, which is a double pinion planetary

42 gearset, with the fourth simple planetary gearset, which is a single pinion planetary gearset.

41. The powertrain of claim 40, wherein a sun gear and a planet carrier of the first simple planetary gearset are fixedly connected respectively to a sun gear and a ring gear of the second simple planetary gearset.

42. The powertrain of claim 41, wherein the first operating element is a combination of the sun gears of the first and second simple planetary gearsets;

the second operating element is a ring gear of the first simple planetary gearset;

the third operating element is a planet carrier of the second simple planetary gearset; and the fourth operating element is a combination of the planet carrier and ring gear of the first and second simple planetary gearsets.

43. The powertrain of claim 40, wherein a sun gear and a ring gear of the first simple planetary gearset are fixedly connected respectively to a ring gear and a planet carrier of the second simple planetary gearset.

44. The powertrain of claim 43, wherein the first operating element is a sun gear of the second simple planetary gearset;

the second operating element is a planet carrier of the first simple planetary gearset;

the third operating element is a combination of the ring gear and planet carrier of the first and second simple planetary gearsets; and the fourth operating element is a combination of the sun gear and ring gear of the first and second simple planetary gearsets.

45. The powertrain of claim 40, wherein a planet carrier and a ring gear of the third simple planetary gearset are fixedly connected respectively to a planet carrier and a sun gear of the fourth simple planetary gearset.

46. The powertrain of claim 45, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

47. The powertrain of claim 40, wherein a planet carrier and a ring gear of the third simple planetary gearset are fixedly connected respectively to a planet carrier and a sun gear of the fourth simple planetary gearset.

48. The powertrain of claim 47, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

49. The powertrain of claim 1, wherein the first compound planetary gearset is realized by the combination of the first simple planetary gearset, which is a single pinion planetary gearset, with the second simple planetary gearset, which is a double pinion planetary gearset, and the second compound planetary gearset is realized by the combination of the third simple planetary gearset, which is a double pinion planetary gearset, with the fourth simple planetary gearset, which is a single pinion planetary gearset.

50. The powertrain of claim 49, wherein a planet carrier and a ring gear of the first simple planetary gearset are fixedly connected respectively to a planet carrier and a ring gear of the second simple planetary gearset.

51. The powertrain of claim 50, wherein the first operating element is a sun gear of the first simple planetary gearset;

the second operating element is a combination of the planet carriers of the first and second simple planetary gearsets;

the third operating element is the ring gear of the second simple planetary gearset; and the fourth operating element is a combination of the ring gear of the first simple planetary gearset and a sun gear of the second simple planetary gearset.

52. The powertrain of claim 49, wherein a planet carrier and a ring gear of the third simple planetary gearset are fixedly connected respectively to a planet carrier and a sun gear of the fourth simple planetary gearset.

53. The powertrain of claim 52, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

54. The powertrain of claim 49, wherein a planet carrier and a ring gear of the third simple planetary gearset are fixedly connected respectively to a planet carrier and a sun gear of the fourth simple planetary gearset.

55. The powertrain of claim 54, wherein the fifth operating element is a sun gear of the third simple planetary gearset;

the sixth operating element is a ring gear of the fourth simple planetary gearset;

the seventh operating element is a combination of the planet carriers of the third and fourth simple planetary gearsets; and the eighth operating element is a combination of the ring gear and sun gear of the third and fourth simple planetary gearsets.

56. The powertrain of claim 1, wherein the clutch means comprises a first clutch interposed between a combination of ring gears of the first simple planetary gearset and a combination of a sun gear and a ring gear of the third and fourth simple planetary gearsets, and a second clutch interposed between a combination of the ring gears of the first simple planetary gearset and a planet carrier of the fourth simple planetary gearset.

57. The powertrain of claim 1, wherein the brake means comprises a first brake for fixing one of the first, second, third, and fourth operating elements and a second brake for fixing one of the fifth, sixth, seventh, and eighth operating elements.

* * * * *